United States Patent
Watanabe et al.

(10) Patent No.: US 11,834,068 B2
(45) Date of Patent: Dec. 5, 2023

(54) VEHICLE CONTROL SYSTEM AND VEHICLE CONTROL DEVICE FOR AUTONOMOUS VEHICLE

(71) Applicant: TOYOTA JIDOSHA KABUSHIKI KAISHA, Toyota (JP)

(72) Inventors: Yoshinori Watanabe, Gotemba (JP); Kazuyuki Fujita, Gotemba (JP); Takayuki Goto, Yokohama (JP); Masahiro Harada, Hadano (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 17/029,517

(22) Filed: Sep. 23, 2020

(65) Prior Publication Data

US 2021/0107514 A1  Apr. 15, 2021

(30) Foreign Application Priority Data

Oct. 15, 2019  (JP) .................................. 2019-188903

(51) Int. Cl.
*B60W 60/00* (2020.01)
*B60W 30/12* (2020.01)
*B60W 30/18* (2012.01)

(52) U.S. Cl.
CPC ........ *B60W 60/0011* (2020.02); *B60W 30/12* (2013.01); *B60W 30/18163* (2013.01);
(Continued)

(58) Field of Classification Search
CPC .. B60W 60/0011; B60W 30/10; B60W 30/12; B60W 30/18163; B60W 2554/20;
(Continued)

(56) References Cited

U.S. PATENT DOCUMENTS 7,871,083 B2 * 1/2011 Urababa ............ B60G 17/0162
280/5.511
8,670,903 B2 * 3/2014 Lee ...................... B62D 15/025
701/28
(Continued)

FOREIGN PATENT DOCUMENTS

DE 102010024142 A1 12/2011
EP 701106 A1 * 3/1996 ............. G01C 21/26
(Continued)

OTHER PUBLICATIONS

B. Kim and S. Park, "ECU Software Updating Scenario Using OTA Technology through Mobile Communication Network," 2018 IEEE 3rd International Conference on Communication and Information Systems (ICCIS), Singapore, 2018, pp. 67-72, doi: 10.1109/ICOMIS.2018.8645019. (Year: 2018).*

*Primary Examiner* — Angelina Shudy
(74) *Attorney, Agent, or Firm* — Sughrue Mion, PLLC

(57) ABSTRACT

A vehicle control system for an autonomous vehicle includes: a first control device configured to generate a first driving plan including desired lateral lane driving positions or desired lateral lane driving position ranges; a plurality of first sensors configured to obtain information on motion of the vehicle and information on surroundings of the vehicle; and a second control device configured to communicate with the first control device, generate, based on the first driving plan obtained from the first control device and the information obtained by the first sensors, a second driving plan different from the first driving plan, the second driving plan including target lateral lane driving positions or target lateral lane driving position ranges, and control driving operation of the vehicle based on the second driving plan.

18 Claims, 19 Drawing Sheets

(52) U.S. Cl.
CPC ..... *B60W 2552/10* (2020.02); *B60W 2554/20* (2020.02); *B60W 2554/40* (2020.02)

(58) Field of Classification Search
CPC ......... B60W 2554/40; B60W 2552/10; B60W 60/0015; B60W 2420/42; B60W 2420/52; B60W 2520/10; B60W 2520/105; B60W 2520/14; B60W 2540/18; B60W 2556/50; B60W 2754/20; B60W 30/14; B60W 60/001; B60W 40/02; B60W 40/105; B60W 2050/0005; B60W 2520/06; B60W 2556/45; G05D 1/0088; G08G 1/096816; G08G 1/096822; G08G 1/096844; G01C 21/3415; B60K 35/00
See application file for complete search history.

(56) References Cited

U.S. PATENT DOCUMENTS

| | | | | |
|---|---|---|---|---|
| 9,227,635 | B1* | 1/2016 | Takamatsu | B62D 5/0433 |
| 9,755,850 | B2* | 9/2017 | Stolfus | G08G 1/0116 |
| 9,984,564 | B2* | 5/2018 | Bogren | G08G 1/0112 |
| 10,025,315 | B2* | 7/2018 | Klinger | G01S 13/02 |
| 10,102,687 | B1* | 10/2018 | Sampigethaya | G06Q 50/30 |
| 10,477,994 | B2* | 11/2019 | Johnson | H04W 92/18 |
| 10,565,873 | B1* | 2/2020 | Christensen | G05D 1/0055 |
| 10,668,920 | B2* | 6/2020 | Fujii | B60W 30/0953 |
| 10,795,358 | B2* | 10/2020 | Asakura | G01C 21/34 |
| 11,008,039 | B2* | 5/2021 | Fujii | B60W 30/12 |
| 11,320,282 | B2* | 5/2022 | Mishina | G01C 21/3484 |
| 2009/0240432 | A1* | 9/2009 | Osanai | G06V 20/584 701/300 |
| 2009/0287405 | A1* | 11/2009 | Liu | G01C 21/3697 701/119 |
| 2010/0235035 | A1* | 9/2010 | Nishira | B60T 7/22 701/31.4 |
| 2010/0324797 | A1* | 12/2010 | Fritz | B60W 10/06 701/1 |
| 2011/0275354 | A1* | 11/2011 | Akhter | G01C 21/3697 455/414.1 |
| 2012/0083959 | A1* | 4/2012 | Dolgov | B60R 1/00 701/23 |
| 2012/0245834 | A1* | 9/2012 | Klooster | G08G 5/0034 701/120 |
| 2013/0231830 | A1* | 9/2013 | Van Dan Elzen | B60W 50/16 701/41 |
| 2014/0074392 | A1* | 3/2014 | Holm | G01C 21/3415 701/400 |
| 2015/0012166 | A1* | 1/2015 | Hauler | G05D 1/0077 701/23 |
| 2015/0149511 | A1* | 5/2015 | Van Den Bergh | G06F 16/21 707/805 |
| 2015/0161892 | A1* | 6/2015 | Oremus | B60W 30/095 340/901 |
| 2015/0285648 | A1* | 10/2015 | Masuda | G01C 21/3688 701/533 |
| 2016/0195406 | A1 | 7/2016 | Miles et al. | |
| 2016/0313738 | A1 | 10/2016 | Kindo et al. | |
| 2016/0368491 | A1* | 12/2016 | Hauler | B60W 60/00186 |
| 2017/0158237 | A1* | 6/2017 | Sakamoto | G05D 1/0291 |
| 2017/0168164 | A1* | 6/2017 | Lee | H04W 4/025 |
| 2017/0197710 | A1* | 7/2017 | Ma | G08G 5/0069 |
| 2017/0217422 | A1* | 8/2017 | Nakamura | B60W 30/09 |
| 2017/0236422 | A1 | 8/2017 | Naka et al. | |
| 2017/0372617 | A1* | 12/2017 | Bruno | G01C 21/3826 |
| 2018/0029610 | A1* | 2/2018 | McNew | B60W 50/0097 |
| 2018/0037136 | A1* | 2/2018 | Nelson | B60L 53/65 |
| 2018/0126951 | A1* | 5/2018 | Ricci | B60R 25/305 |
| 2018/0135989 | A1* | 5/2018 | Schreier | H04W 4/44 |
| 2018/0215392 | A1* | 8/2018 | Kosaka | B60W 50/12 |
| 2018/0265084 | A1* | 9/2018 | Inou | B60W 60/0015 |
| 2018/0267542 | A1* | 9/2018 | Lamon | G05D 1/024 |
| 2018/0312253 | A1* | 11/2018 | Zhao | G05D 1/102 |
| 2018/0314252 | A1* | 11/2018 | Asakura | G01C 21/3415 |
| 2019/0012909 | A1* | 1/2019 | Mintz | G07C 5/008 |
| 2019/0056667 | A1* | 2/2019 | Schwartz | H01L 31/0216 |
| 2019/0077397 | A1* | 3/2019 | Fairfield | B60W 60/00274 |
| 2019/0084561 | A1 | 3/2019 | Takeda et al. | |
| 2019/0113930 | A1* | 4/2019 | Mimura | B60W 30/10 |
| 2019/0156667 | A1* | 5/2019 | Arshad | G01C 21/3415 |
| 2019/0212744 | A1* | 7/2019 | Milstein | B60W 30/16 |
| 2019/0226862 | A1* | 7/2019 | Shaukat | G08G 1/127 |
| 2019/0324458 | A1* | 10/2019 | Sadeghi | G05D 1/0088 |
| 2019/0361442 | A1* | 11/2019 | Izaki | B60W 50/14 |
| 2019/0384380 | A1* | 12/2019 | Woo | G06V 20/20 |
| 2019/0384977 | A1* | 12/2019 | Woo | G06V 20/56 |
| 2019/0385379 | A1* | 12/2019 | Woo | A63F 13/5375 |
| 2019/0391581 | A1* | 12/2019 | Vardaro | A61B 5/02055 |
| 2020/0124439 | A1* | 4/2020 | Fowe | G08G 1/0112 |
| 2020/0132497 | A1* | 4/2020 | Glebov | G05D 1/0088 |
| 2020/0150659 | A1* | 5/2020 | Guptha | B60W 10/04 |
| 2020/0150681 | A1* | 5/2020 | Wang | G07C 5/085 |
| 2020/0189583 | A1* | 6/2020 | Tatourian | H04W 4/46 |
| 2020/0208994 | A1* | 7/2020 | Askeland | G01C 21/30 |
| 2020/0208998 | A1* | 7/2020 | Xiang | G01C 21/3415 |
| 2020/0241523 | A1* | 7/2020 | Brandin | B60W 40/02 |
| 2020/0307595 | A1* | 10/2020 | Kato | B60W 10/20 |
| 2020/0307628 | A1* | 10/2020 | Kato | B60W 60/0011 |
| 2020/0319647 | A1* | 10/2020 | Ha | G08G 1/096791 |
| 2020/0339150 | A1* | 10/2020 | Olsson | B60W 40/08 |
| 2020/0342107 | A1* | 10/2020 | Soryal | G06F 8/71 |
| 2021/0019350 | A1* | 1/2021 | Dixon | G06F 16/5866 |
| 2021/0039714 | A1* | 2/2021 | Huq | B62D 6/00 |
| 2021/0070290 | A1* | 3/2021 | Tardy-Tuch | B60W 30/18145 |
| 2021/0146958 | A1* | 5/2021 | Tanaka | B60W 30/0956 |
| 2021/0150896 | A1* | 5/2021 | Rakshit | G08G 1/0145 |
| 2021/0163026 | A1* | 6/2021 | Ochida | B60W 50/035 |
| 2021/0190530 | A1* | 6/2021 | Jung | G06V 20/20 |
| 2021/0192946 | A1* | 6/2021 | Nawa | G01C 21/3407 |
| 2021/0197824 | A1* | 7/2021 | Kim | G06V 20/58 |
| 2021/0197852 | A1* | 7/2021 | Fairfield | B60W 60/001 |
| 2021/0237769 | A1* | 8/2021 | Ostafew | G08G 1/042 |
| 2021/0256778 | A1* | 8/2021 | Mazar | F02M 35/09 |
| 2021/0279603 | A1* | 9/2021 | Teran Matus | G06F 16/65 |
| 2021/0280060 | A1* | 9/2021 | Rider | G08G 1/0962 |
| 2021/0294341 | A1* | 9/2021 | Oh | G06N 3/08 |
| 2021/0300336 | A1* | 9/2021 | Hara | B60W 30/06 |
| 2021/0354725 | A1* | 11/2021 | King | B60W 40/06 |
| 2022/0017093 | A1* | 1/2022 | Tamori | B60W 60/0015 |
| 2022/0194420 | A1* | 6/2022 | Chu | B60W 30/18154 |
| 2022/0242448 | A1* | 8/2022 | Chen | B60W 60/0011 |
| 2022/0276655 | A1* | 9/2022 | Takahashi | G05D 1/0088 |

FOREIGN PATENT DOCUMENTS

| | | |
|---|---|---|
| JP | 2016-71566 A | 5/2016 |
| JP | 2016-203882 A | 12/2016 |
| JP | 2017-144759 A | 8/2017 |
| JP | 2017-215653 A | 12/2017 |
| JP | 2018-077086 A | 5/2018 |
| JP | 2019-108124 A | 7/2019 |

* cited by examiner

VEHICLE CONTROL SYSTEM AND VEHICLE CONTROL DEVICE FOR AUTONOMOUS VEHICLE

INCORPORATION BY REFERENCE

The disclosure of Japanese Patent Application No. 2019-188903 filed on Oct. 15, 2019 including the specification, drawings and abstract is incorporated herein by reference in its entirety.

BACKGROUND

1. Technical Field

The disclosure relates to vehicle control systems and vehicle control devices for autonomous vehicles.

2. Description of Related Art

A vehicle control system that is mounted on an autonomous vehicle controls driving operation of the vehicle according to a driving plan. For example, Japanese Unexamined Patent Application Publication No. 2017-215653 discloses a system that performs autonomous driving control by performing steering and braking maneuvers while referring to a detailed route generated based on a detailed map.

SUMMARY

Various services using autonomous vehicles are currently under development. Generating a good driving plan for autonomous driving of a vehicle is the key to success in services using autonomous vehicles. What kind of driving plan is preferable depends on the content of the service to be provided, the area where the service is provided, etc. Depending on the type of service, it may be desirable to also designate lateral lane driving positions of the vehicle rather than merely designating a driving route. Specific examples of such services include such services that occupants get in and out of vehicles, such as ridesharing, taxis, and buses. Even for in-house logistics services that use autonomous vehicles in premises such as factories and distribution centers, it will be convenient if the lateral lane driving positions of each vehicle can be designated. Similar demands are expected for services that want to attract people's attention, such as advertisement and food trucks.

However, in systems that merely designate a driving route as in the related art, the lateral lane driving positions of the vehicle can be inappropriate for the service. Accordingly, service providers may want to use their own programs and data which are based on their knowledge, instead of existing programs and data, to generate a driving plan including the lateral lane driving positions of the vehicle.

Functions related to vehicle control for autonomous vehicles include a function to detect from the surroundings of the vehicle any obstacle that may collide with the vehicle and avoid the obstacle. In the case where the calculation accuracy or control accuracy for this function is low, the vehicle cannot be controlled to appropriate lateral lane driving positions according to the surroundings of the vehicle. Depending on the situation, this may make an occupant(s) of the vehicle and people around the vehicle feel anxiety, leading to poor service. It is not easy for service providers with little knowledge and experience of vehicle control to calculate appropriate lateral lane driving positions of the vehicle according to the surroundings of the vehicle.

In this regard, automakers that have been developing autonomous vehicles know well about motion characteristics of vehicles and have long experience of vehicle control. They also have vast knowledge of sensors for obtaining information on vehicle's motion and information on the surroundings of the vehicle and of placement of these sensors. Accordingly, even when individual service providers generate a driving plan suitable for their services, they will be able to provide ideal services that use autonomous vehicles if they can depend on the automakers' knowledge to present an appropriate driving plan according to the surroundings of the vehicle.

According to the disclosure, when providing a service that uses autonomous vehicles, the vehicle can be controlled to appropriate lateral lane driving positions according to the surroundings of the vehicle while realizing a driving plan suitable for the service as much as possible.

A first aspect of the disclosure relates to a vehicle control system for an autonomous vehicle. The vehicle control system includes a first control device, a plurality of first sensors, and a second control device. The first control device is configured to generate a first driving plan including desired lateral lane driving positions or desired lateral lane driving position ranges which are located next to each other in a direction of travel of a vehicle. The first sensors are configured to obtain information on motion of the vehicle and information on surroundings of the vehicle. The second control device is configured to communicate with the first control device, generate, based on the first driving plan obtained from the first control device and the information obtained by the first sensors, a second driving plan different from the first driving plan, the second driving plan including target lateral lane driving positions or target lateral lane driving position ranges which are located next to each other in the direction of travel of the vehicle, and control driving operation of the vehicle based on the second driving plan.

According to the vehicle control system with the above configuration, the first driving plan, which is a desired driving plan, is not used as it is, but the second driving plan is generated based on the first driving plan and the information obtained from the first sensors, and the second driving plan is used to control the driving operation of the vehicle. The second driving plan reflects not only the first driving plan but also the information obtained from the first sensors and the second driving plan thus is a target driving plan according to the surroundings of the vehicle. Accordingly, the vehicle can be controlled to appropriate lateral lane driving positions according to the surroundings of the vehicle while realizing a driving plan desired by a user as much as possible.

According to the vehicle control system with the above configuration, for example, the first control device may be a dedicated control device prepared by a service provider that is the user, and the second control device may be a vehicle control device mounted on the autonomous vehicle. This allows individual service providers to generate a driving plan suitable for their services while depending on the knowledge of an automaker in charge of the second control device to designate appropriate lateral lane driving positions according to the surroundings of the vehicle. The first control device may be configured to receive setting of the first driving plan by the user of the vehicle, and the second control device may be configured to prohibit setting or modification of the second driving plan by the user.

In the above aspect, the first driving plan may include vehicle speeds associated with the desired lateral lane driving positions or the desired lateral lane driving position ranges. The vehicle speeds included in the first driving plan are reflected in the second driving plan that is used to control the driving operation of the vehicle. Depending on the type of service, it may be desired to designate not only the lateral lane driving positions but also the vehicle speeds. Since the first driving plan includes the vehicle speeds, the vehicle can not only be controlled to the lateral lane driving positions suitable for the service but also be controlled to travel at the vehicle speeds suitable for the service.

In the above aspect, the second driving plan may include vehicle speeds associated with the target lateral lane driving positions or the target lateral lane driving position ranges. That is, the target driving positions or the target lateral lane driving position ranges and the vehicle speeds associated with the target driving positions or the target lateral lane driving position ranges may be determined based on the first driving plan obtained from the first control device and the information obtained from the first sensor. Appropriate vehicle speeds reflecting the information obtained from the first sensors are thus realized according to the surroundings of the vehicle. In the case where the first driving plan includes the vehicle speeds, the vehicle can be controlled to travel at appropriate speeds according to the surroundings of the vehicle while realizing the vehicle speeds included in the first driving plan as much as possible.

In the above aspect, the second control device may be configured to generate the second driving plan based on information on motion characteristics of the vehicle. Since the second driving plan is generated using the information on the motion characteristics of the vehicle, calculation accuracy of the target lateral lane driving positions and the target lateral lane driving position ranges is further improved.

In the above aspect, the second control device may be configured to generate, based on the information obtained from the first sensors and the information on the motion characteristics of the vehicle, driving assistance information that contributes to improvement in driving safety of the vehicle, and generate the second driving plan based on the driving assistance information. The second control device can generate accurate driving assistance information by putting together the information on motion of the vehicle and the information on the surroundings of the vehicle which are obtained from the first sensors and the information on the motion characteristics of the vehicle. By using this driving assistance information to generate the second driving plan, the second control device can accurately calculate appropriate lateral lane driving positions according to the surroundings of the vehicle.

In the above aspect, the second control device may be configured to generate, as the driving assistance information, area information on a dangerous area or a safe area which is located in the direction of travel of the vehicle.

By using this area information to generate the second driving plan, the second control device can accurately calculate appropriate lateral lane driving positions according to the surroundings of the vehicle.

In the above aspect, the second control device may be configured to generate, as the driving assistance information, a third driving plan that is used to select a driving path avoiding a dangerous area or a driving path running in a safe area. With this configuration, the second control device generates the second driving plan in view of the driving path avoiding the dangerous area or the driving path running in the safe area, it can accurately calculate appropriate lateral lane driving positions according to the surroundings of the vehicle.

In the above aspect, the third driving plan may include a restriction on speed. For example, the restriction on speed is determined based on the information obtained from the first sensors and the information on the motion characteristics of the vehicle. Since the third driving plan that is used to generate the second driving plan includes the restriction on speed, the vehicle can be controlled to travel at appropriate speeds according to the surroundings of the vehicle.

In the above aspect, the first control device may be configured to be attached to and detached from the vehicle, and the first control device may be configured to be coupled by wire to the second control device via a connector when attached to the vehicle. With this configuration, it is easy to mount the first control device on the vehicle and to replace the first control device. The vehicle can thus be customized for individual service providers by merely replacing the first control device.

The vehicle control system of the above aspect may further include one or more second sensors that are coupled to the first control device and that is configured to obtain information on the surroundings of the vehicle and to send the information on the surroundings of the vehicle to the first control device. The first control device may be configured to generate the first driving plan at least based on the information obtained by the one or more second sensors. With this configuration, the service provider, which is the user, prepares dedicated sensor(s) suitable for the service they want to provide. A driving plan appropriate for the service can thus be generated, which improves the quality of the service that uses autonomous vehicles.

A second aspect of the disclosure is a vehicle control device coupled to an on-board sensor for an autonomous vehicle. The vehicle control device includes a processor and a storage device storing a program that is executable by the processor. The processor is configured to, by executing the program, obtain a first driving plan including desired lateral lane driving positions or desired lateral lane driving position ranges which are located next to each other in a direction of travel of a vehicle, obtain information on motion of the vehicle and information on surroundings of the vehicle from the on-board sensor, generate, based on the first driving plan and the information obtained from the on-board sensor, a second driving plan different from the first driving plan, the second driving plan including target lateral lane driving positions or target lateral lane driving position ranges which are located next to each other in the direction of travel of the vehicle, and control driving operation of the vehicle based on the second driving plan.

According to the vehicle control device with the above configuration, the first driving plan obtained from the outside is not used as it is, but the second driving plan is generated based on the first driving plan and the information obtained from the first sensors, and the second driving plan is used to control the driving operation of the vehicle. The second driving plan thus reflects not only the first driving plan but also the information obtained from the first sensors. Accordingly, the vehicle can be controlled to appropriate lateral lane driving positions according to the surroundings of the vehicle while realizing the first driving plan obtained from the outside as much as possible. The vehicle control device may prohibit setting or modification of the second driving plan by the user.

In the above aspect, the first driving plan may include vehicle speeds associated with the desired lateral lane driving positions or the desired lateral lane driving position ranges.

In the above aspect, the second driving plan may include vehicle speeds associated with the target lateral lane driving positions or the target lateral lane driving position ranges.

In the above aspect, the processor may be configured to generate the second driving plan based on information on motion characteristics of the vehicle.

In the above aspect, the processor may be configured to generate, based on the information obtained from the on-board sensor and the information on the motion characteristics of the vehicle, driving assistance information that contributes to improvement in driving safety of the vehicle, and generate the second driving plan based on the driving assistance information.

In the above aspect, the processor may be configured to generate, as the driving assistance information, area information on a dangerous area or a safe area which is located in the direction of travel of the vehicle.

In the above aspect, the processor may be configured to generate, as the driving assistance information, a third driving plan that is used to select a driving path avoiding a dangerous area or a driving path running in a safe area.

In the above aspect, the third driving plan may include a restriction on speed.

The vehicle control device of the above aspect may further include a connector for coupling to an external computer that is configured to be attached to and detached from the vehicle. The processor may be configured to obtain the first driving plan from the external computer coupled to the connector. For example, the external computer is prepared by a service provider that is a user and generates a driving plan suitable for a service that is provided by the service provider. This allows individual service providers to generate a driving plan suitable for their services while depending on the knowledge of an automaker in charge of the vehicle control device to designate appropriate lateral lane driving positions according to the surroundings of the vehicle.

According to the vehicle control system and the vehicle control device for the autonomous vehicle of the disclosure, when providing a service that uses autonomous vehicles, the vehicle can be controlled to appropriate lateral lane driving positions according to the surroundings of the vehicle while realizing a driving plan suitable for the service as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the disclosure will be described with reference to the accompanying drawings. Numerical values for each element which are mentioned in the following description of embodiments, such as the number, quantity, amount, or range of each element, are not intended to limit the disclosure to the numerical values unless otherwise specified or unless it is theoretically obvious that the disclosure is limited to the numerical values. Structures, steps, etc. that are described in the following embodiments are not necessarily essential to the disclosure unless otherwise specified or unless it is theoretically obvious that the structures, steps, etc. are essential to the disclosure.

1. Configuration of Autonomous Vehicle

A vehicle control system according to an embodiment of the disclosure is a vehicle control system that achieves, e.g., level 3 or higher of driving automation as defined by the Society of Automotive Engineers (SAE). The vehicle control system according to the embodiment of the disclosure is applied to an autonomous vehicle having a general configuration shown in FIG. 1. The configuration of the autonomous vehicle described below is common to all the embodiments of the disclosure.

Figure 1:
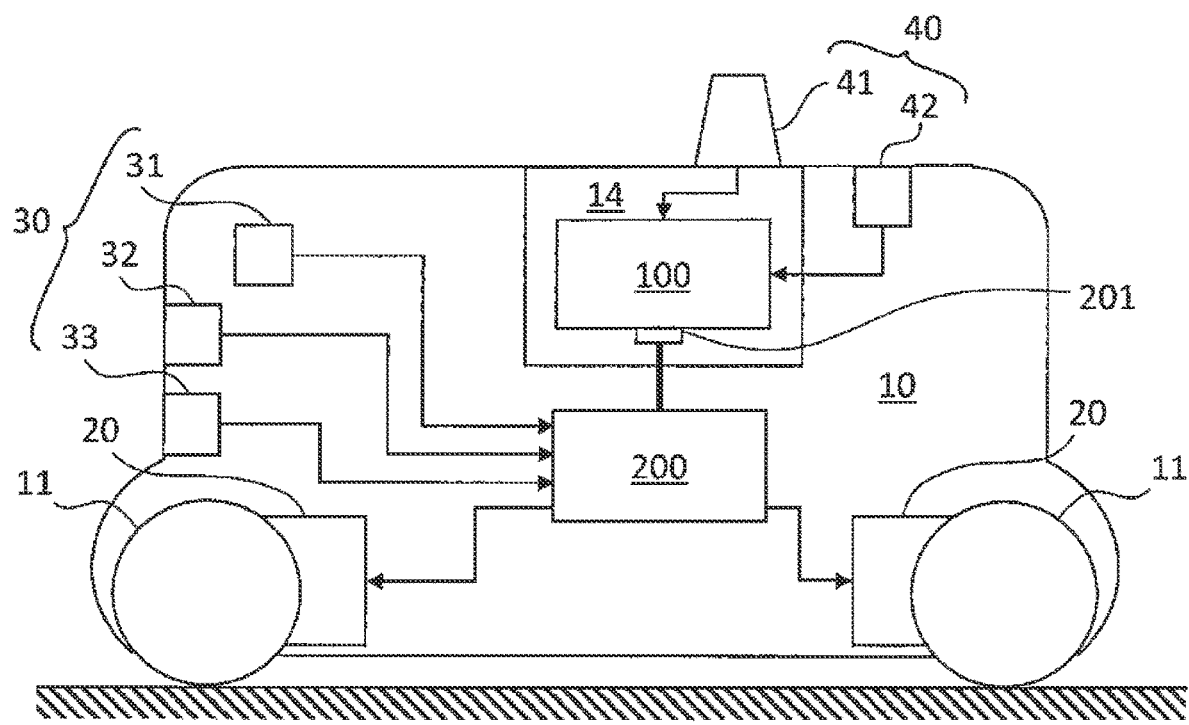
FIG. 1 illustrates a general configuration of a vehicle to which a vehicle control system according to an embodiment of the disclosure has been applied.

As shown in FIG. 1, an autonomous vehicle (hereinafter simply referred to as the vehicle) 10 includes a first control device 100 and a second control device 200 as control devices for autonomous driving. Of the two control devices, the second control device 200 is a vehicle control device mounted in advance on the vehicle 10. The second control device 200 is unique to the vehicle 10 and is provided, together with the vehicle 10, by an automaker. The first control device 100 is an external computer that can be attached to and detached from the vehicle 10. The first control device 100 can therefore be designed and developed by a different entity from that designs and develops the second control device 200. As an example, the first control device 100 is prepared by a service provider that is a user of the vehicle 10.

Figure 2:
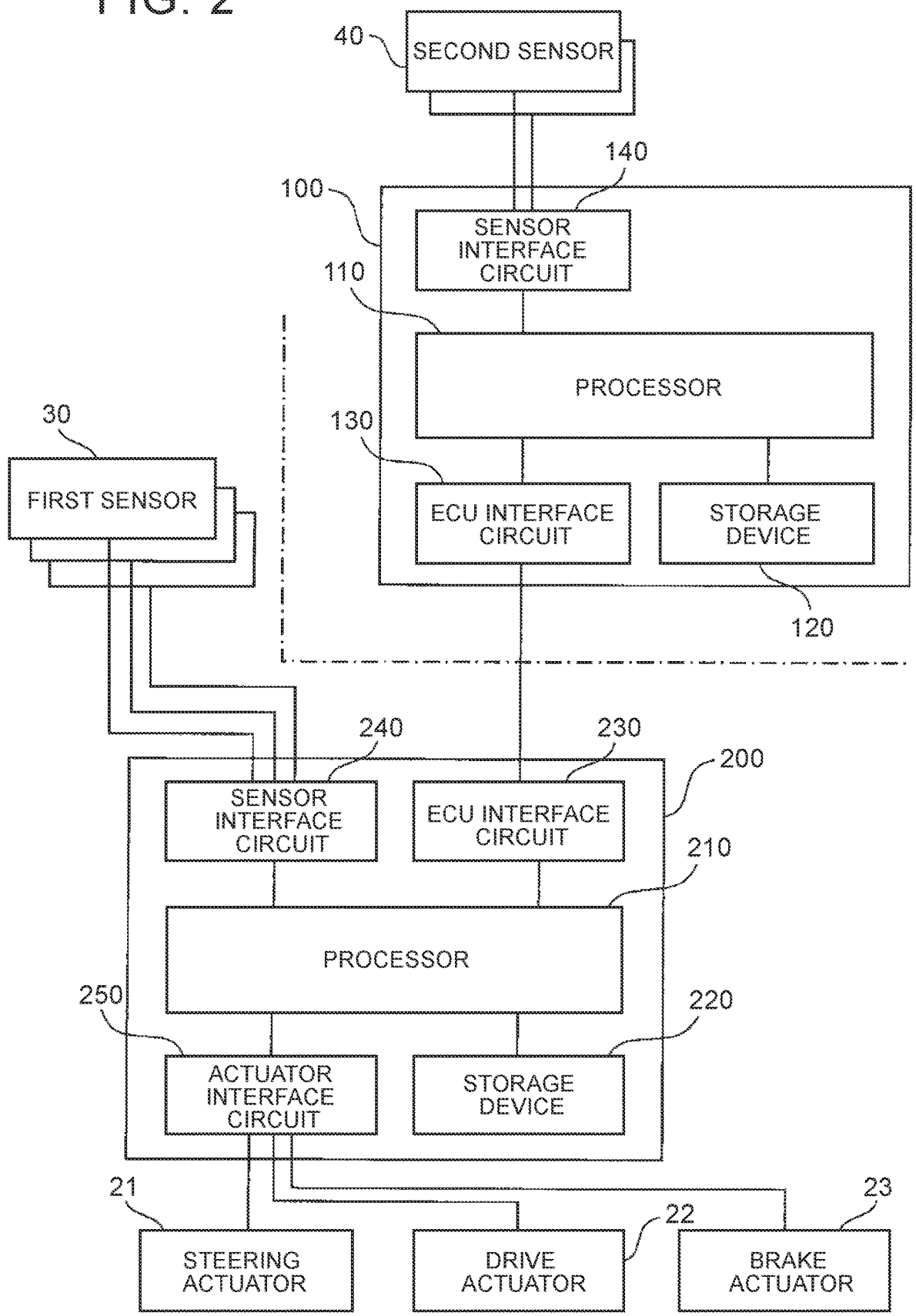
FIG. 2 is a block diagram illustrating a configuration example of the vehicle control system according to the embodiment of the disclosure.

The second control device 200 is electrically coupled to control elements and sensors of the vehicle 10. Specifically, the second control device 200 is electrically coupled to vehicle actuators 20 for controlling driving operation of the vehicle 10. The vehicle actuators 20 include a drive actuator 22 that drives wheels 11, a brake actuator 23 that brakes the wheels 11, and a steering actuator 21 that steers the wheels 11 (see FIG. 2). The drive actuator 22 includes, e.g., an engine, an EV system, or a hybrid system. The brake actuator 23 includes, e.g., a hydraulic brake or a power regenerative brake. The steering actuator 21 includes, e.g., a power steering system, a steer-by-wire steering system, or a rear wheel steering system.

The second control device 200 is electrically coupled to sensors such as a camera 32, a millimeter wave radar 33, and vehicle sensors 31. The camera 32 and the millimeter wave radar 33 are sensors that obtain information on the surroundings of the vehicle 10. For example, these sensors are used to detect an obstacle that is present around the vehicle 10 and to measure the position and speed of the detected obstacle relative to the vehicle 10. The vehicle sensors 31 are sensors that obtain information on motion of the vehicle 10. The vehicle sensors 31 include, e.g., a speed sensor that measures the traveling speed of the vehicle 10 from the rotational speed of the wheels 11, an acceleration sensor that measures acceleration acting on the vehicle 10, a yaw rate sensor that measures the angular velocity of rotation of the vehicle 10, a steering angle sensor that measures the steering angle, etc. These sensors 31, 32, and 33 are on-board sensors 30 that, together with the second control device 200, are mounted in advance on the vehicle 10. On-board sensors other than those described above may be coupled to the second control device 200. Unlike dedicated sensors that will be described later, the types and specifications of on-board sensors 30 are common to the vehicles 10.

The first control device 100 is mounted in an installation space 14 in the vehicle 10. In FIG. 1, the installation space 14 is provided in a ceiling part of the vehicle 10. It is preferable that the installation space 14 be located in such a place that is not accessible from the outside of the vehicle 10 and that the installation space 14 does not bother an occupant(s) of the vehicle 10. Specifically, it is preferable that the installation space 14 be provided under the floor or behind a wall of a passenger compartment. The first control device 100 is coupled by wire to the second control device 200 via a detachable connector 201. It is therefore easy to mount the first control device 100 on the vehicle 10 and replace the first control device 100. The vehicle 10 can thus be customized for individual service providers by merely replacing the first control device 100.

The first control device 100 is electrically coupled to sensors such as a light detection and ranging (LiDAR) sensor 41 and a GPS sensor 42. The LiDAR sensor 41 is used to obtain information on the shape and position of an object that is present around the vehicle 10. The GPS sensor 42 is used to obtain information on the current location of the vehicle 10. In the present embodiment, the LiDAR sensor 41 and the GPS sensor 42 are provided as dedicated sensors 40 that are electrically coupled only to the first control device 100 and that send obtained information to the first control device 100. The dedicated sensors 40 are prepared, together with the first control device 100, by the service provider, namely the user. Dedicated sensors other than those described above may be coupled to the first control device 100. The types and specifications of dedicated sensors 40 to be mounted can be determined by the user themselves according to the content of their service. Since the service provider, namely the user, prepares the dedicated sensors 40 suitable for the service they want to provide, a driving plan appropriate for the service can be generated, which improves the quality of the service that uses autonomous vehicles. Hereinafter, the on-board sensors 30 are referred to as the first sensors 30 and the dedicated sensors 40 are referred to as the second sensors 40. Signals from the first sensors 30 may be input to the first control device 100.

2. Configuration of Vehicle Control System

The configuration of the vehicle control system according to the embodiment of the disclosure will be described. One configuration example of the vehicle control system according to the embodiment of the disclosure can be shown by a block diagram of FIG. 2. In the vehicle control system, the first control device 100 and the second control device 200 are connected so that they can communicate with each other. The configuration of the vehicle control system described below is common to all the embodiments of the disclosure.

The first control device 100 is an electronic control unit (ECU) including at least a processor 110, a storage device 120, an ECU interface circuit 130, and a sensor interface circuit 140. The storage device 120 includes a main storage device and an auxiliary storage device. The ECU interface circuit 130 is an interface circuit for communication with the second control device 200. The sensor interface circuit 140 is an interface circuit for communication with the second sensors 40 coupled to the first control device 100. These interface circuits use, e.g., Controller Area Network (CAN) communication or communication according to the Ethernet (registered trademark) standards.

The first control device 100 has a function to generate a driving plan desired by the service provider, namely the user. The driving plan that is generated by the first control device 100 is hereinafter referred to as the first driving plan. The storage device 120 has stored therein a first driving plan program that can be executed by the processor 110 and various data. The first driving plan program is programmed so that a driving plan suitable for the service that is provided by the user is obtained. The first driving plan program is designed by the user themselves based on their knowledge on their service. Data required for the driving plan is also prepared at the user's own discretion. The data includes map information. Map information focused on the service that is provided by the user may be prepared. By executing the first driving plan program, the processor 110 obtains sensor information from the second sensors 40 via the sensor interface circuit 140, generates the first driving plan based on the sensor information and the prestored data, and outputs the first driving plan from the ECU interface circuit 130.

The second control device 200 is an ECU including at least a processor 210, a storage device 220, an ECU interface circuit 230, a sensor interface circuit 240, and an actuator interface circuit 250. The storage device 220 includes a main storage device and an auxiliary storage device. The ECU interface circuit 230 is an interface circuit for communication with the first control device 100. As described above, the second control device 200 and the first control device 100 are physically coupled by wire via the connector 201. The sensor interface circuit 240 is an interface circuit for communication with the first sensors 30 coupled to the second control device 200. The actuator interface circuit 250 is an interface circuit for communication with the steering actuator 21, the drive actuator 22, and the brake actuator 23. These interface circuits use, e.g., CAN communication or communication according to the Ethernet (registered trademark) standards.

The second control device 200 has a function to generate an appropriate driving plan according to the surroundings of the vehicle 10, based on the first driving plan. While the first driving plan is a driving plan desired by the user, the driving plan that is generated by the second control device 200 is a target driving plan to be used to control driving operation of the vehicle 10. The driving plan that is generated by the second control device 200 is hereinafter referred to as the second driving plan. The storage device 220 has stored therein programs that can be executed by the processor 210 and various data. These programs and data are unique to the vehicle 10, and different programs and data are prepared for each type of vehicle.

The programs stored in the storage device 220 include a second driving plan program and a driving operation control program. These programs are designed based on the automaker's knowledge of motion characteristics of the vehicle and detection characteristics of the on-board sensors and their long experience of vehicle control. The data stored in the storage device 220 include basic specification information of the vehicle 10, vehicle weight, and information on motion characteristics of the vehicle 10 such as maximum possible acceleration, maximum possible lateral acceleration, and steering response speed. By executing the second driving plan program, the processor 210 obtains the first driving plan via the ECU interface 230, obtains sensor information from the first sensors 30 via the sensor interface circuit 240, and generates a second driving plan based on the first driving plan, the sensor information, and the prestored data. By executing the driving operation control program, the processor 210 calculates manipulated variables for the actuators 21, 22, and 23 which are to be used to drive the vehicle 10 according to the second driving plan, and outputs these manipulated variables from the actuator interface circuit 250.

The second control device 200 may be composed of a plurality of ECUs. For example, the second control device 200 may be composed of an ECU that generates the second driving plan and an ECU that calculates the manipulated variables for the actuators. The ECU that generates the second driving plan may be composed of an ECU that directly processes the sensor information obtained from the first sensors 30 and an ECU that calculates the second driving plan using the processing results of the sensor information. The ECU that directly processes the sensor information obtained from the first sensors 30 may be mounted integrally with the first sensors 30. Similarly, the first control device 100 may be composed of a plurality of ECUs.

3. Overview of Driving Plans

As described above, both the first control device 100 and the second control device 200 have a function to generate a driving plan. However, the first control device 100 and the second control device 200 generate the first driving plan and the second driving plan, respectively, from different perspectives. An overview of the first driving plan and the second driving plan will be given below with reference to FIGS. 3 and 4. Due to the difference in perspective in generating the driving plan, the first control device 100 receives setting of the first driving plan by the user of the vehicle 10, while the second control device 200 prohibits setting or modification of the second driving plan by the user.

Figure 3:
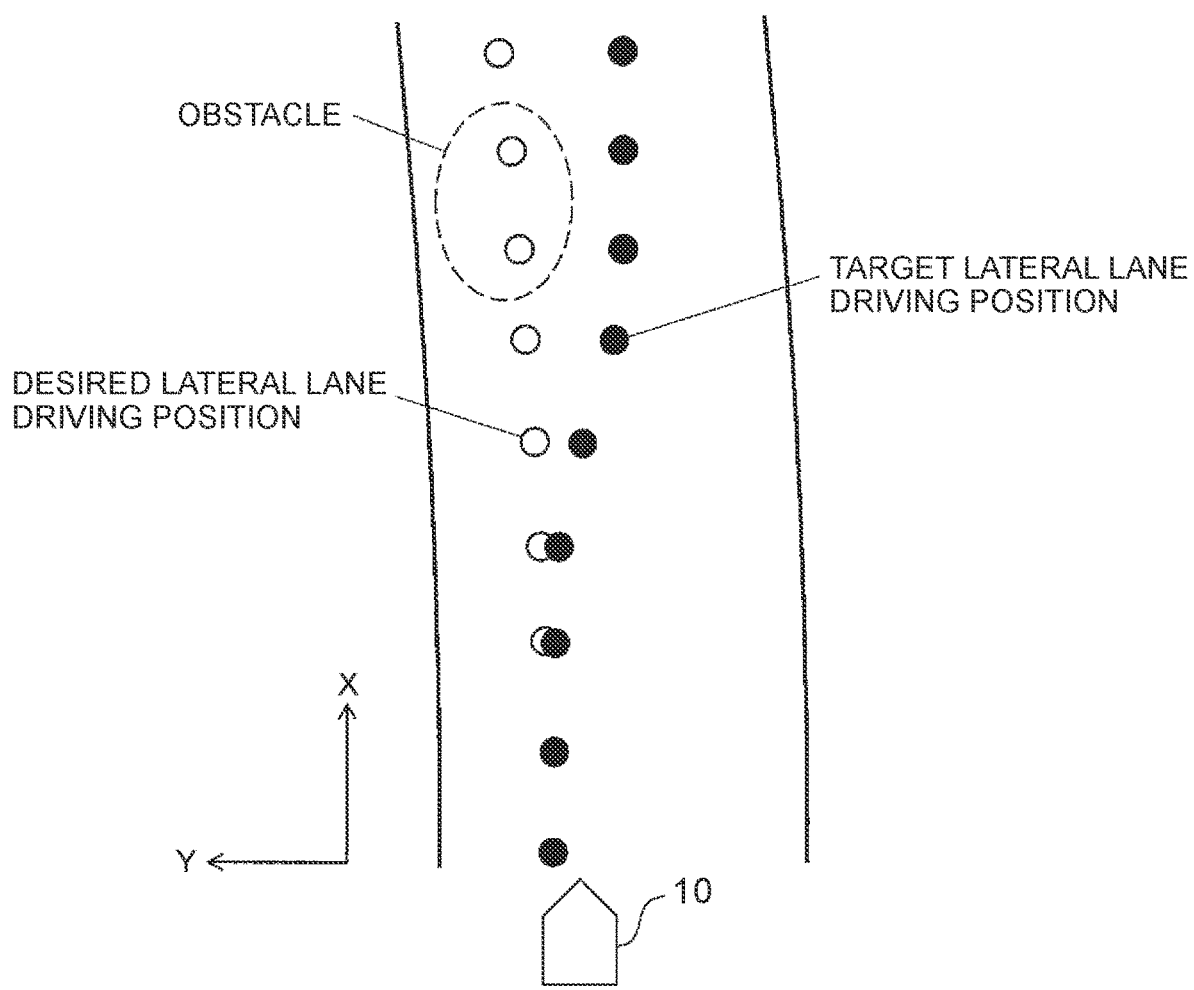
FIG. 3 is a conceptual diagram illustrating an overview of first and second driving plans according to the embodiment of the disclosure.
Figure 4:
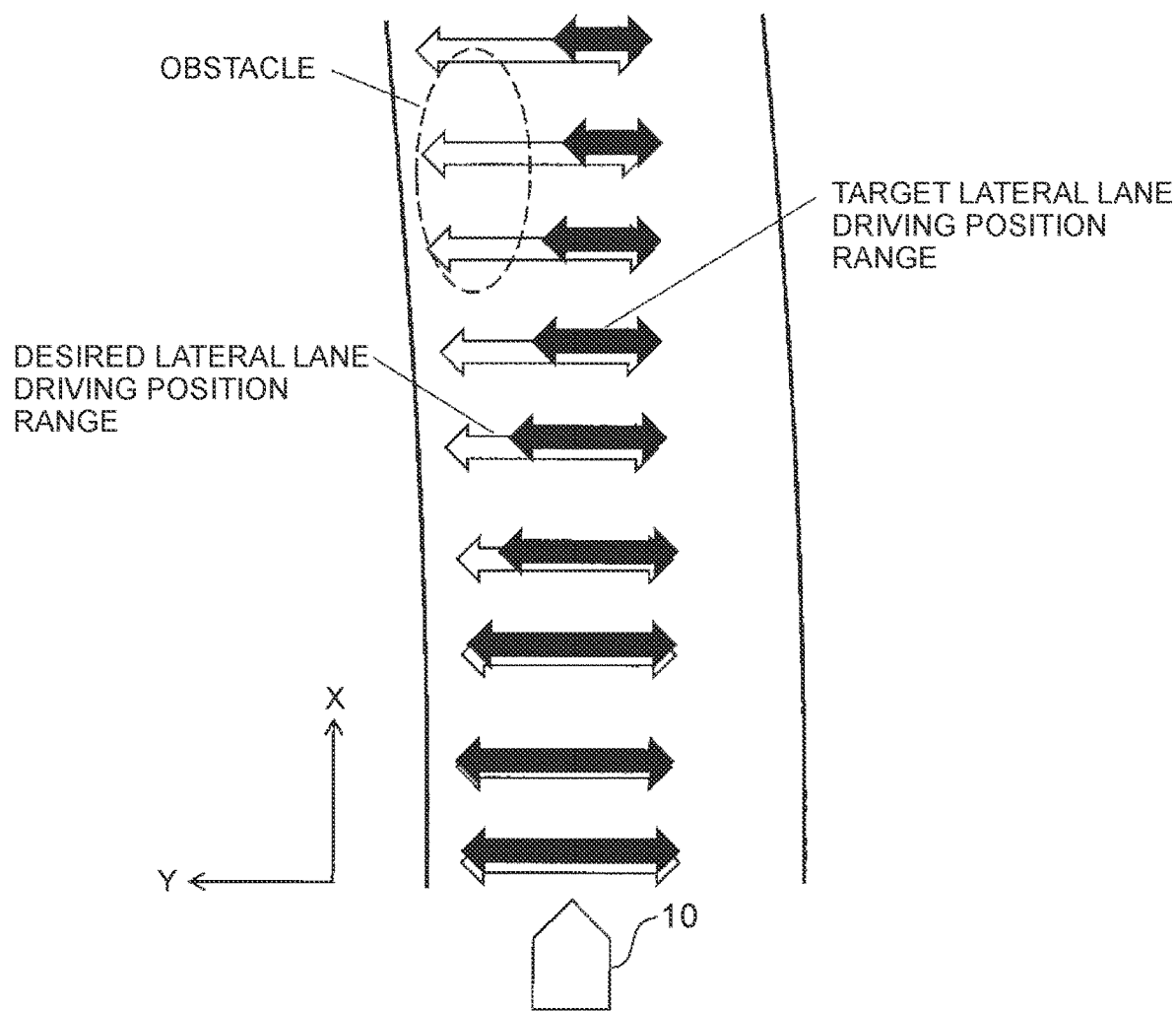
FIG. 4 is a conceptual diagram illustrating an overview of the first and second driving plans according to the embodiment of the disclosure.

In some cases, the driving plan is represented by a set of lateral lane driving positions located next to each other in the direction of travel, and in other cases, the driving plan is represented by a set of lateral lane driving position ranges located next to each other in the direction of travel. FIG. 3 illustrates an example of the former case, and FIG. 4 illustrates an example of the latter case.

The example shown in FIG. 3 will be described. In this example, as shown by white circles in FIG. 3, the first control device 100 discretely outputs desired lateral lane driving positions along the direction of travel of the vehicle 10. The desired lateral lane driving positions are lateral lane driving positions suitable for the service that is provided by the user. For example, when the user provides such a service that occupants get in and out of vehicles such as ridesharing, taxis, or buses, the desired lateral lane driving positions may be set so that the vehicle 10 moves toward the edge of its lane as necessary. The set of desired lateral lane driving positions shown by the white circles in FIG. 3 represents the first driving plan.

Depending on the surroundings of the vehicle 10, however, it may not always be possible to control the driving operation of the vehicle 10 according to the driving plan desired by the user. For example, in the case where there is an obstacle at the position shown by dashed line in FIG. 3, the vehicle 10 will collide with the obstacle if the driving operation of the vehicle 10 is controlled according to the first driving plan. Accordingly, as shown by black circles in FIG. 3, the second control device 200 discretely outputs, along the direction of travel of the vehicle 10, such target lateral lane driving positions that the vehicle 10 can avoid the obstacle. However, the second control device 200 does not set the target lateral lane driving positions to the lateral lane driving positions that are completely irrelevant to the desired lateral lane driving positions. The second control device 200 sets the target lateral lane driving positions so that the lateral lane driving positions desired by the user are attained as much as possible. The set of target lateral lane driving positions shown by the black circles in FIG. 3 represents the second driving plan.

Next, the example shown in FIG. 4 will be described. In this example, as shown by white double arrows in FIG. 4, the first control device 100 discretely outputs desired lateral lane driving position ranges along the direction of travel of the vehicle 10. The desired lateral lane driving position ranges are the ranges of lateral lane driving positions desired by the user and indicate the ranges of lateral lane driving positions suitable for the service that is provided by the user. In the case where a relatively high degree of flexibility is allowed for the lateral lane driving positions, it is preferable to represent the desired lateral lane driving positions by finite ranges as shown in FIG. 4. The set of desired lateral lane driving position ranges shown by the white double arrows in FIG. 4 represents the first driving plan.

However, in the case where there is an obstacle at the position shown by dashed line in FIG. 4 and the obstacle overlaps any of the desired lateral lane driving position ranges, the driving operation of the vehicle 10 cannot be controlled according to the driving plan desired by the user. In this case, as shown by black double arrows in FIG. 4, the second control device 200 discretely outputs, along the direction of travel of the vehicle 10, such target lateral lane driving position ranges that the vehicle 10 can avoid the obstacle. Specifically, the second control device 200 sets the target lateral lane driving position ranges so that the lateral lane driving position ranges desired by the user are attained as much as possible. The set of target lateral lane driving position ranges shown by the black double arrows in FIG. 4 represents the second driving plan.

4. Specific Examples of First Driving Plan

The first driving plan that is generated by the first control device 100 will be described in more detail using specific examples.

Figure 5:
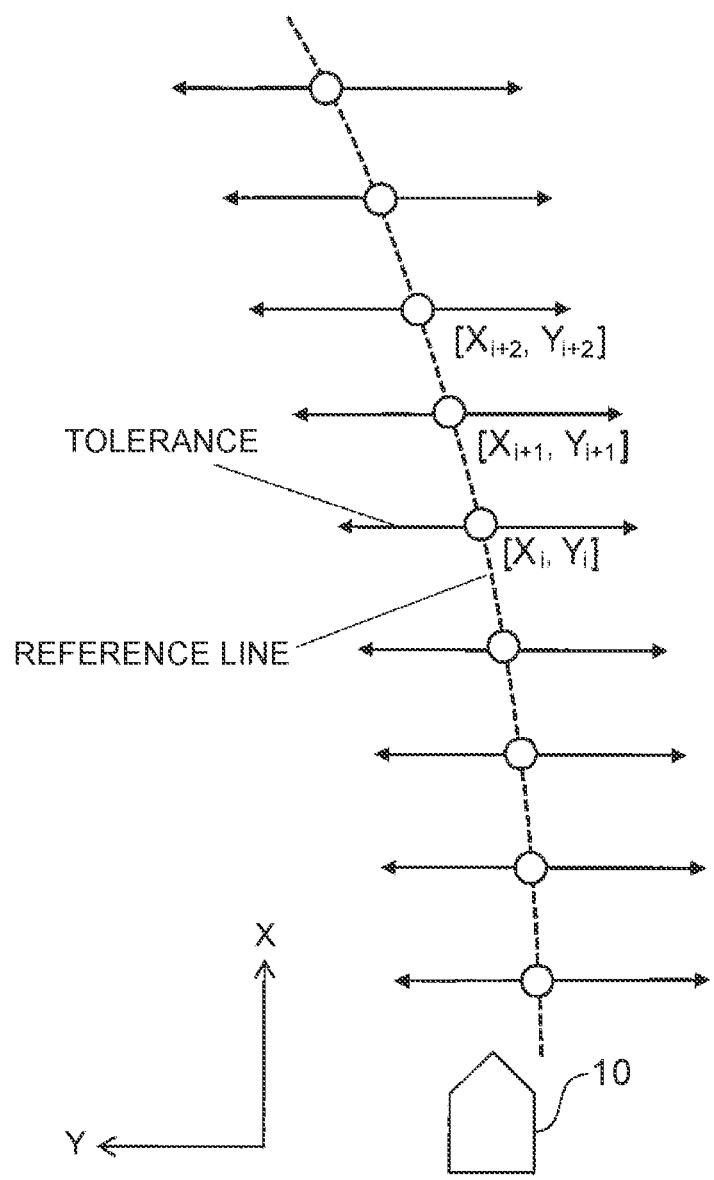
FIG. 5 is a conceptual diagram illustrating a first specific example of a data format of the first driving plan according to the embodiment of the disclosure.

FIG. 5 is a conceptual diagram illustrating a first specific example of a data format of the first driving plan. In the first specific example, each desired lateral lane driving position range is represented by one of points defining a reference line along which the vehicle 10 is desired to travel and tolerance at that point. Each point on the reference line indicates a lateral lane driving position most suitable for the service that is provided by the user, and the tolerance at each point indicates how much deviation from the reference line is allowed when providing the service. The position of each point on the reference line is specified by coordinates $[X_i, Y_i]$ in a coordinate system $(X, Y)$ based on the vehicle 10. In the example shown in FIG. 5, the X direction is a direction toward the front of the vehicle 10, and the Y direction is a direction perpendicular to the X direction. The coordinate system $(X, Y)$ is not limited to the example shown in FIG. 5.

Figure 6:
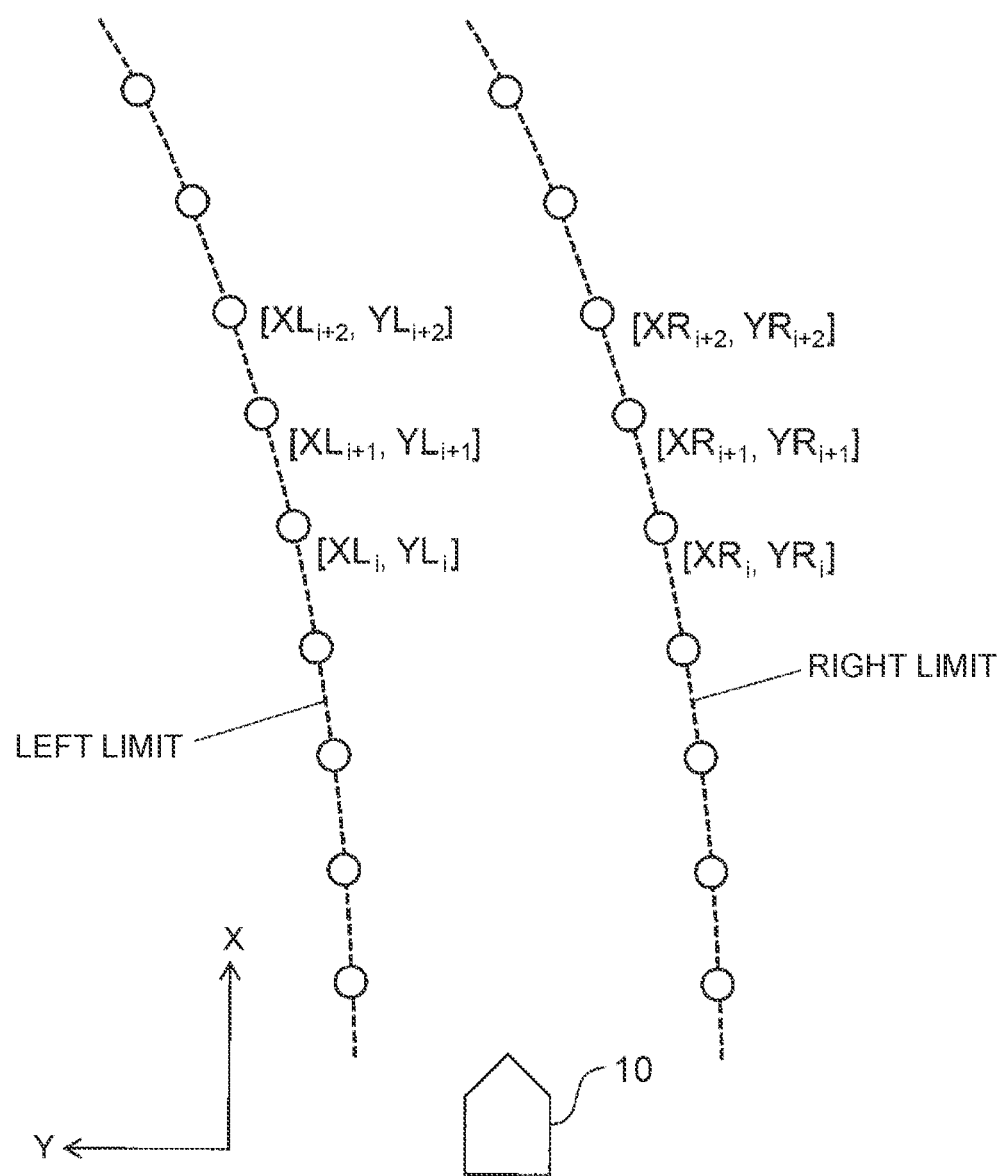
FIG. 6 is a conceptual diagram illustrating a second specific example of the data format of the first driving plan according to the embodiment of the disclosure.

FIG. 6 is a conceptual diagram illustrating a second specific example of the data format of the first driving plan. In the second specific example, each desired lateral lane driving position range is represented by one of points defining a left limit and one of points defining a right limit. The points on the left limit indicate the left limit points of lateral lane driving positions suitable for the service, and the position of each point on the left limit is specified by coordinates $[XL_i, YL_i]$ in a coordinate system $(X, Y)$ based on the vehicle 10. The points on the right limit indicate the right limit points of the lateral lane driving positions suitable for the service, and the position of each point on the right limit is specified by coordinates $[XR_i, YR_i]$ in the coordinate system $(X, Y)$ based on the vehicle 10.

Figure 7:
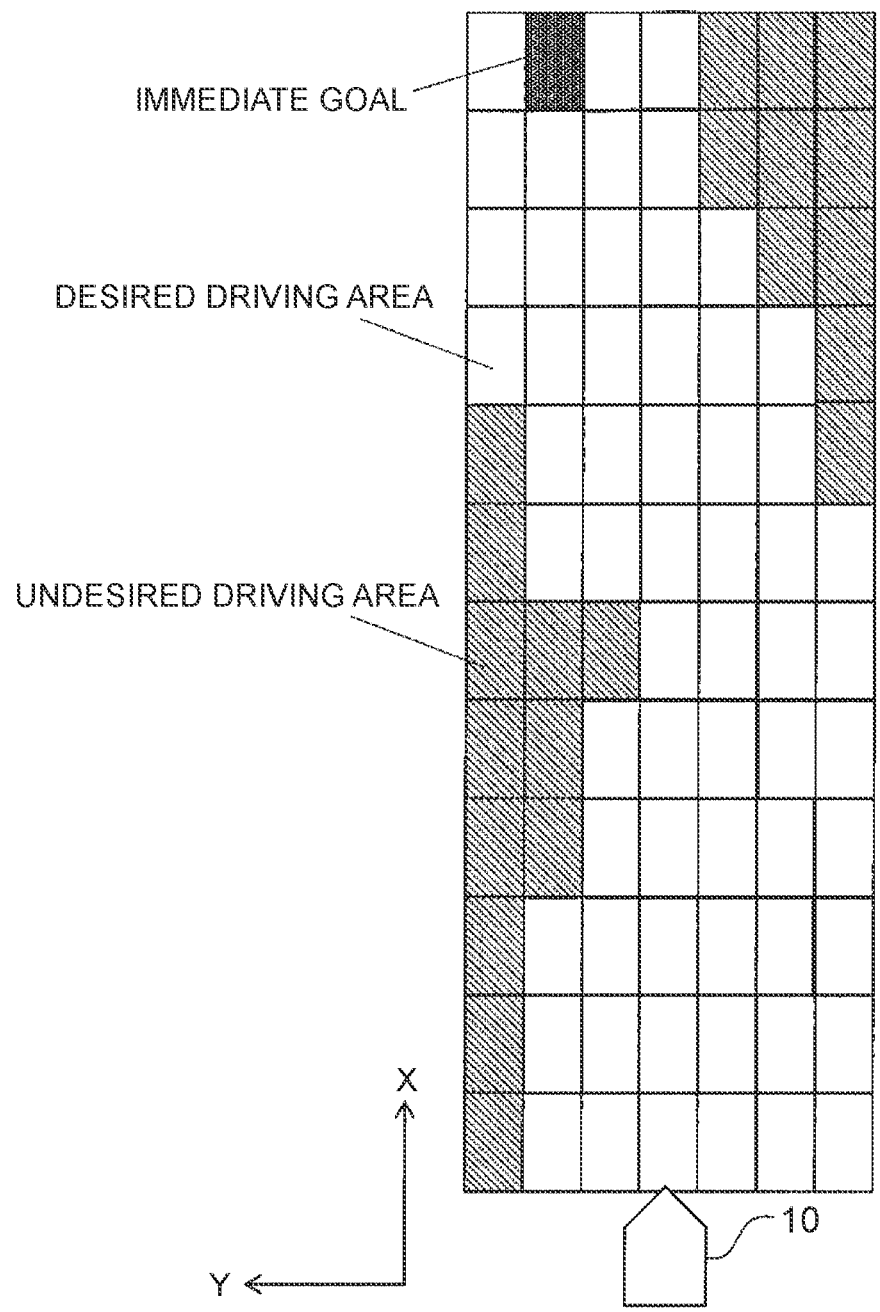
FIG. 7 is a conceptual diagram illustrating a third specific example of the data format of the first driving plan according to the embodiment of the disclosure.

FIG. 7 is a conceptual diagram illustrating a third specific example of the data format of the first driving plan. In the third specific example, an area located ahead in the direction of travel of the vehicle 10 is divided into a plurality of meshes in both the X direction and the Y direction and is thus represented in a mesh pattern in a coordinate system $(X, Y)$ based on the vehicle 10. For the X direction, meshes are formed up to the position of an immediate goal. For the Y direction, meshes are formed in an area corresponding to the width of the vehicle's lane. A tag indicating whether the mesh is a desired driving area where the vehicle 10 is desired to travel or an undesired driving area where the vehicle 10 is not desired to travel is attached to each mesh. Each desired lateral lane driving position range is represented by the desired driving areas located next to each other in the Y direction.

Figure 8:
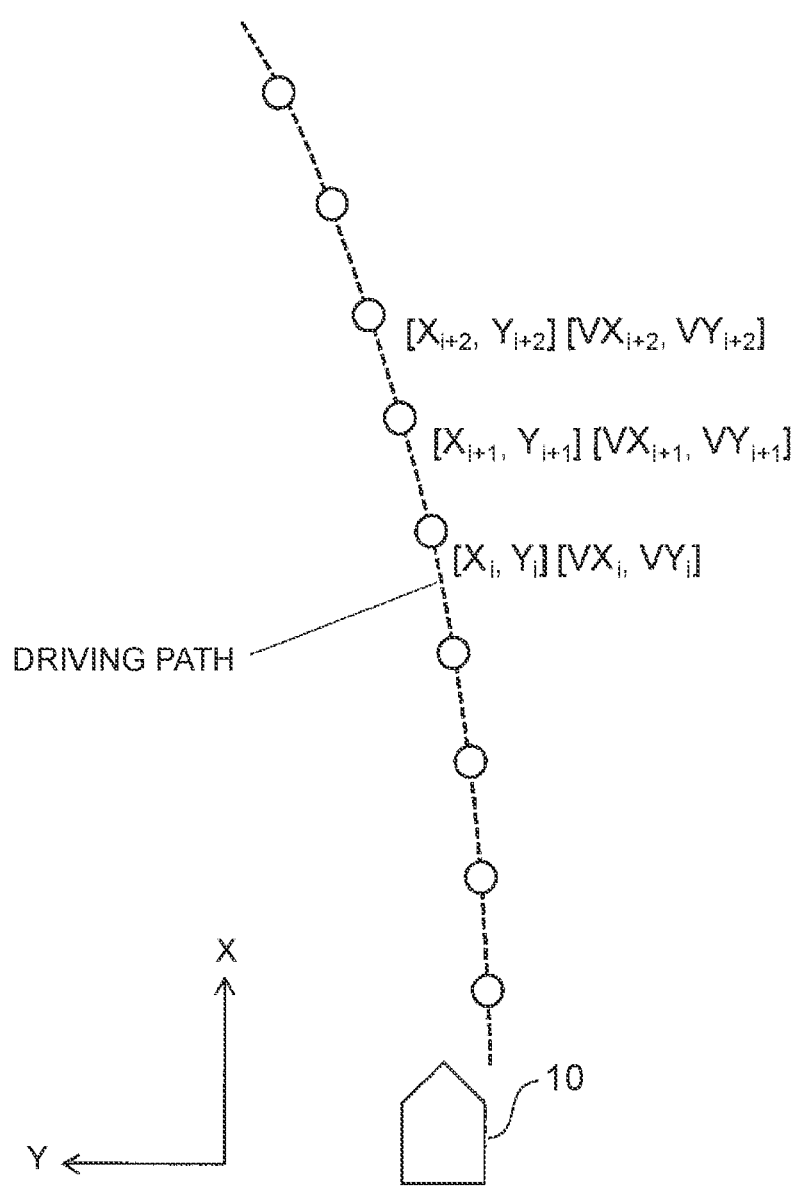
FIG. 8 is a conceptual diagram illustrating a fourth specific example of the data format of the first driving plan according to the embodiment of the disclosure.

FIG. 8 is a conceptual diagram illustrating a fourth specific example of the data format of the first driving plan. In the first to third specific examples, the first driving plan is represented by a set of desired lateral lane driving position ranges located next to each other in the direction of travel. In the fourth specific example, on the other hand, the first driving plan is represented by a set of desired lateral lane driving positions located next to each other in the direction of travel. That is, in the fourth specific example, each desired lateral lane driving position is represented by one of points defining a driving path (desired path) the vehicle 10 is desired to follow. The points on the driving path indicate lateral lane driving positions most suitable for the service that is provided by the user. The position of each point on the driving path is specified by coordinates $[X_i, Y_i]$ in a coordinate system $(X, Y)$ based on the vehicle 10, and a speed $[VX_i, VY_i]$ is associated with each point on the driving path.

In the fourth specific example, the first driving plan includes the vehicle speeds $[VX_i, VY_i]$ associated with the desired lateral lane driving positions $[X_i, Y_i]$ located next to each other in the direction of travel. Similarly, in the first to third specific examples, the first driving plan may include the vehicle speeds associated with the desired lateral lane driving position ranges located next to each other in the direction of travel. This is because, depending on the type of service, it is sometimes desired to designate not only the lateral lane driving positions or the lateral lane driving position ranges but also the vehicle speeds.

Figure 9:
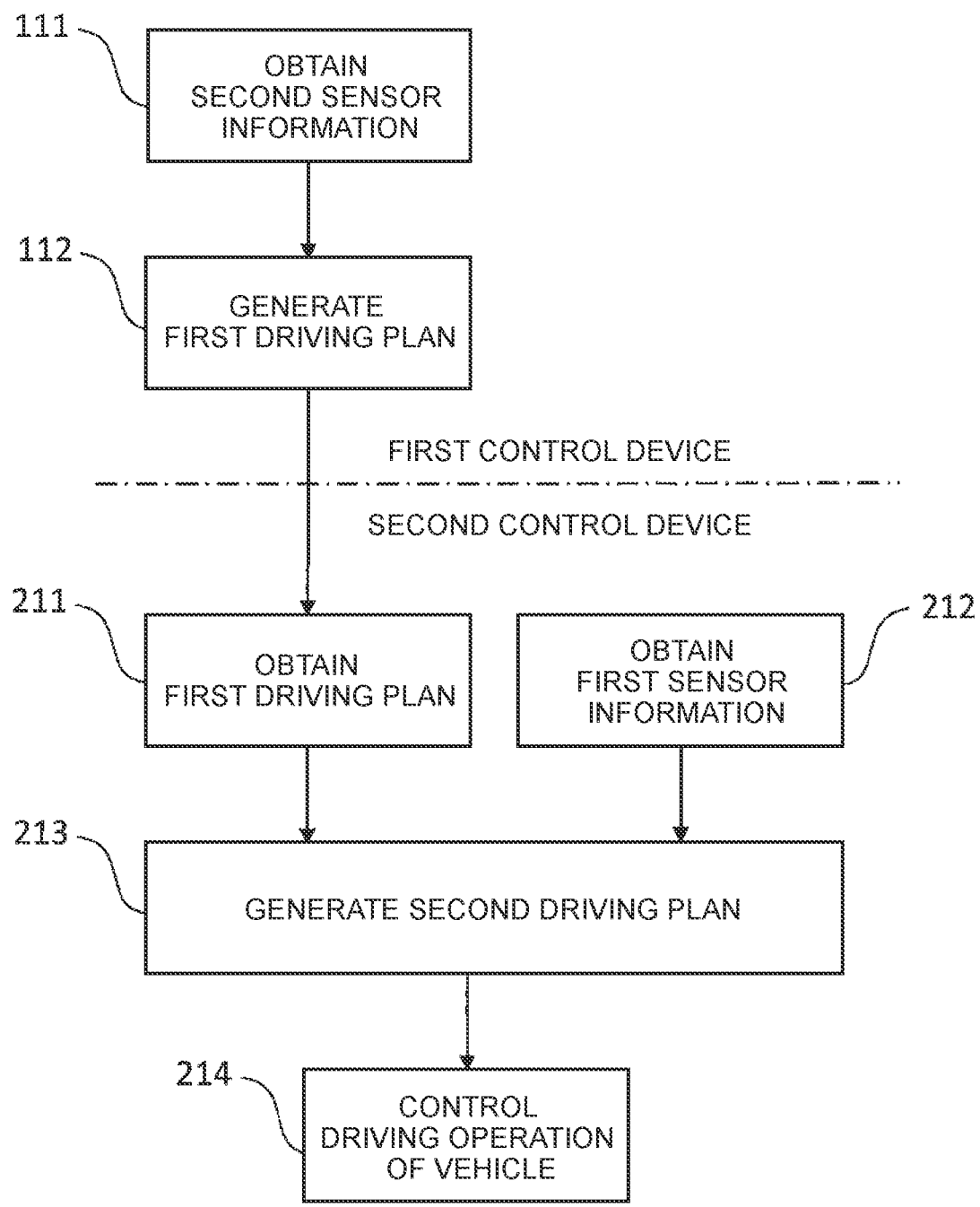
FIG. 9 is a block diagram illustrating functions and process flow of a vehicle control system according to a first embodiment of the disclosure.

5. Functions and Process Flow of Vehicle Control System According to First Embodiment Next, functions and process flow of a vehicle control system according to a first embodiment of the disclosure will be described with reference to FIG. 9. FIG. 9 is a block diagram illustrating the flow of a series of processes for autonomous driving of the vehicle 10. The processes for autonomous driving include processes that are performed by the first control device 100 and processes that are performed by the second control device 200.

The first control device 100 performs processes 111, 112. In the first process 111, the first control device 100 obtains sensor information from the second sensors 40. The sensor information includes information on the surroundings of the vehicle 10 and location information of the vehicle 10. Thereafter, in the process 112, the first control device 100 generates a first driving plan having such a data format as described in the first to fourth examples, based on the sensor information obtained from the second sensors 40.

The second control device 200 performs processes 211, 212, 213, and 214. In the process 211, the second control device 200 obtains the first driving plan generated by the first control device 100. In the process 212, the second control device 200 obtains sensor information from the first sensors 30. This sensor information includes information on motion of the vehicle 10 and information on the surroundings of the vehicle 10.

Subsequently, in the process 213, the second control device 200 generates a second driving plan based on the first driving plan and the sensor information obtained from the first sensors 30. In the process 214, the second control device 200 calculates manipulated variables for the vehicle actuators 20 according to the second driving plan and controls driving operation of the vehicle 10. The process of generating a second driving plan by the second control device 200 will be described in detail below using specific examples.

6. Specific Examples of Process of Generating Second Driving Plan According to First Embodiment FIGS. 10 to 14 are conceptual diagrams illustrating specific examples of the process of generating a second driving plan according to the first embodiment of the disclosure. In these conceptual diagrams, it is assumed that an obstacle has been detected ahead in the direction of travel of the vehicle 10 and the position and shape of the obstacle have been specified from first sensor information 301. The second driving plan is generated so that the vehicle 10 can avoid this obstacle.

Figure 10:
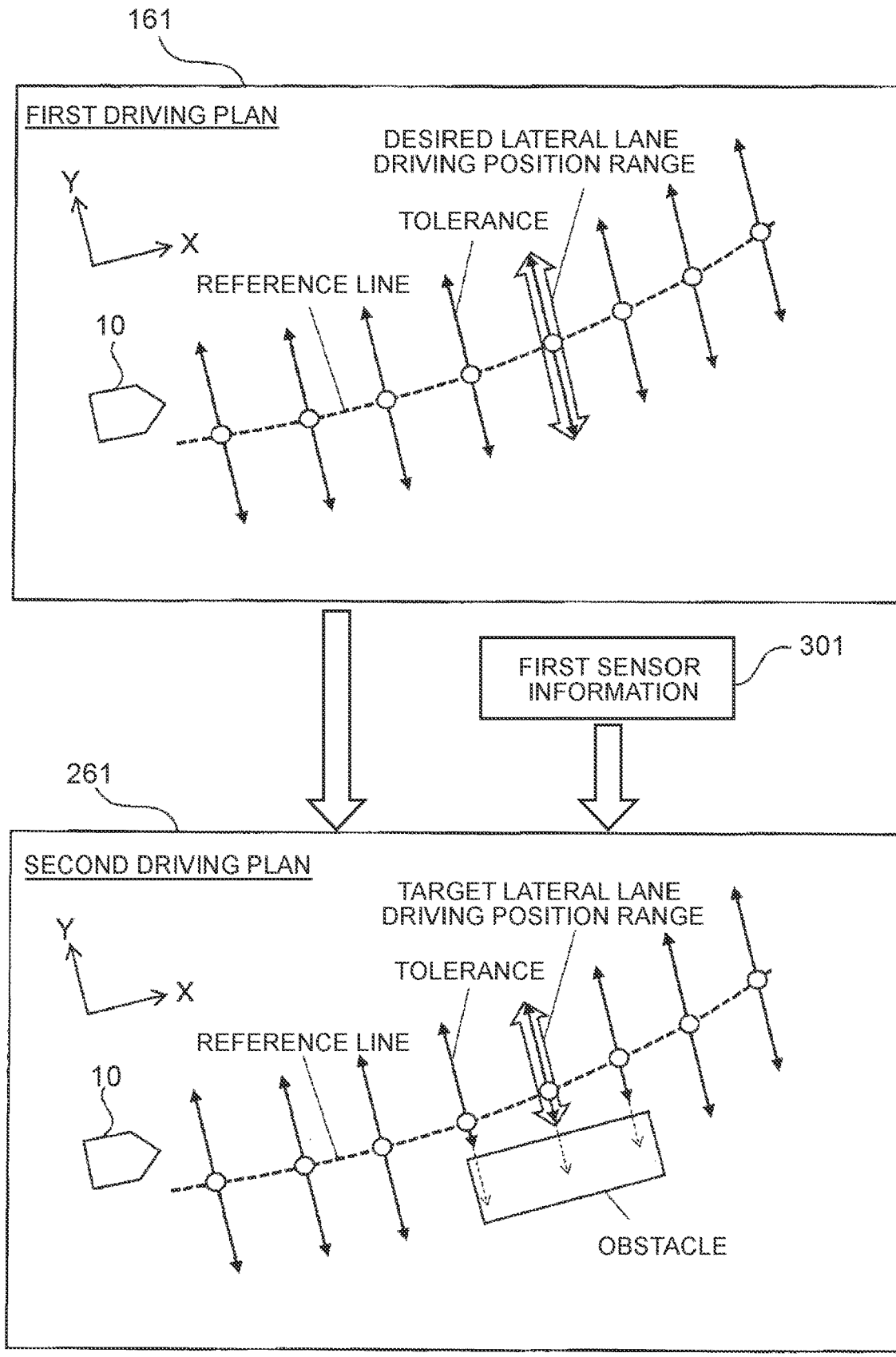
FIG. 10 is a conceptual diagram illustrating a first specific example of a process of generating a second driving plan according to the first embodiment of the disclosure.

FIG. 10 is a conceptual diagram illustrating a first specific example. The data format of a first driving plan 161 shown in FIG. 10 corresponds to the first specific example of the data format of the first driving plan described with reference to FIG. 5. In the case where a reference line in the first driving plan 161 does not interfere with the obstacle, this reference line is used as a reference line in a second driving plan 261. Tolerance at each point on the reference line indicates how much deviation from the reference line is allowed without interference with the obstacle when providing the service. For the second driving plan 261, the tolerance at each point is calculated so that target lateral lane driving position ranges do not interfere with the obstacle whose position and shape have been specified from the first sensor information 301. In the case where the reference line in the first driving plan 161 interferes with the obstacle, the shape of the reference line is modified so as to avoid the obstacle.

In the second driving plan 261 of the first specific example, each target lateral lane driving position range is represented by one of points defining a reference line along which the vehicle 10 should be controlled to travel and tolerance at that point. The second control device 200 generates a target path within the target lateral lane driving position ranges located next to each other in the direction of travel. The target path is represented by a sequence of points located next to each other in the direction of travel. The position of each point on the target path is specified by a coordinate system (X, Y) based on the vehicle 10, and a speed is associated with each point on the target path. In the case where the first driving plan 161 does not include speeds, the speed at each point is set based on, e.g., legal speed limits and the speed of a preceding vehicle. The position of each point on the target path is a target position of the vehicle 10, and the speed associated with each point on the target path is a target speed of the vehicle 10. The second control device 200 calculates manipulated variables for the vehicle actuators 20 based on the target positions and the target speeds so that the vehicle 10 is controlled to follow the target path.

Figure 11:
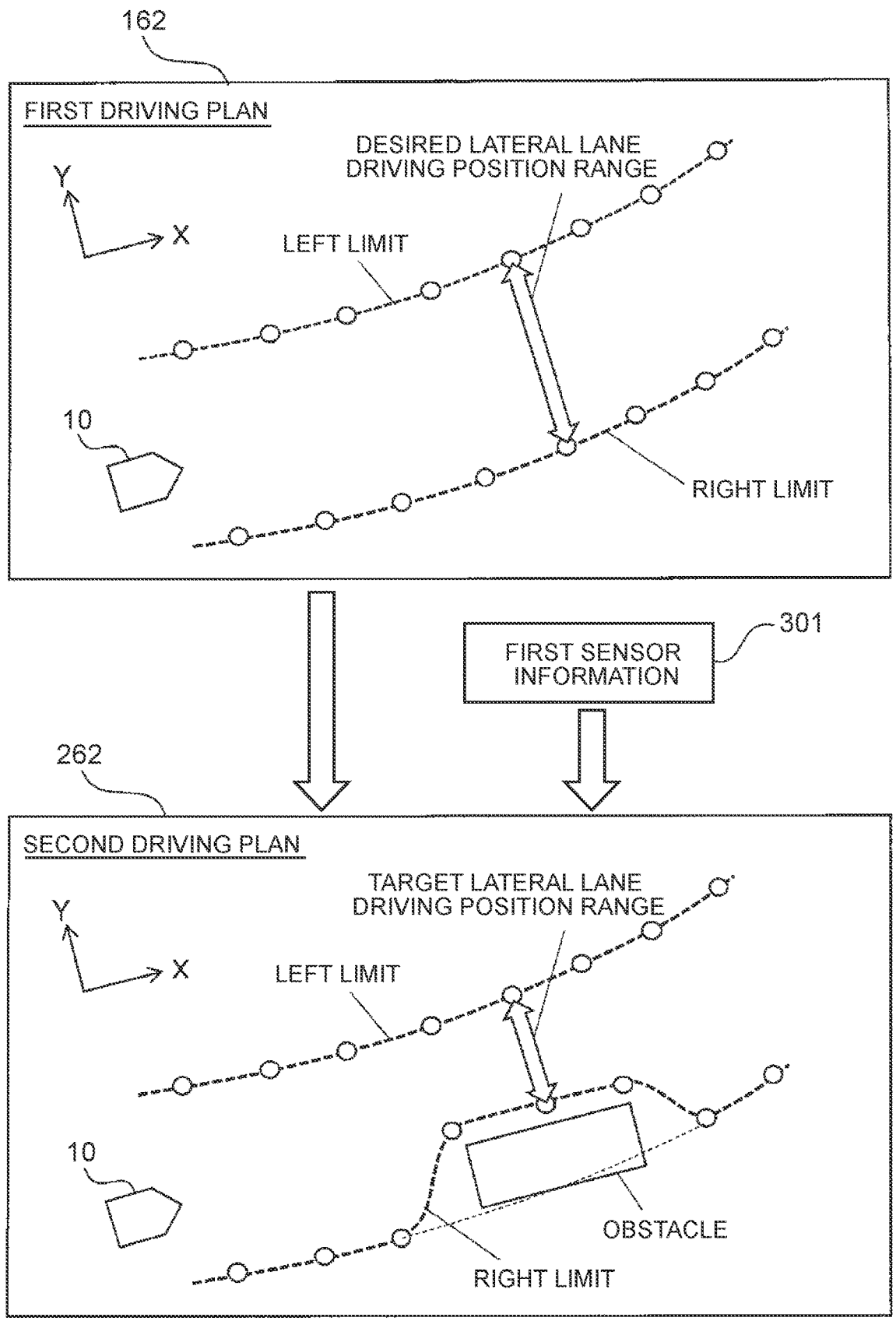
FIG. 11 is a conceptual diagram illustrating a second specific example of the process of generating a second driving plan according to the first embodiment of the disclosure.

FIG. 11 is a conceptual diagram illustrating a second specific example. The data format of a first driving plan 162 shown in FIG. 11 corresponds to the second specific example of the data format of the first driving plan described with reference to FIG. 6. In a second driving plan 262, the positions of right and left limits are adjusted so that the right and left limits do not interfere with the obstacle whose position and shape have been specified from the first sensor information 301. In the example shown in FIG. 11, since the obstacle interferes with the right limit, the position of the right limit is adjusted inward in order to avoid collision of the vehicle 10 with the obstacle. Similarly, in the case where the obstacle interferes with the left limit, the position of the left limit is adjusted inward.

In the second driving plan 262 of the second specific example, each target lateral lane driving position range is represented by one of points defining the left limit and one of points defining the right limit. The second control device 200 generates a target path within the target lateral lane driving position ranges located next to each other in the direction of travel. The second control device 200 calculates manipulated variables for the vehicle actuators 20 based on target positions and target speeds at each point on the target path so that the vehicle 10 is controlled to follow the target path.

Figure 12:
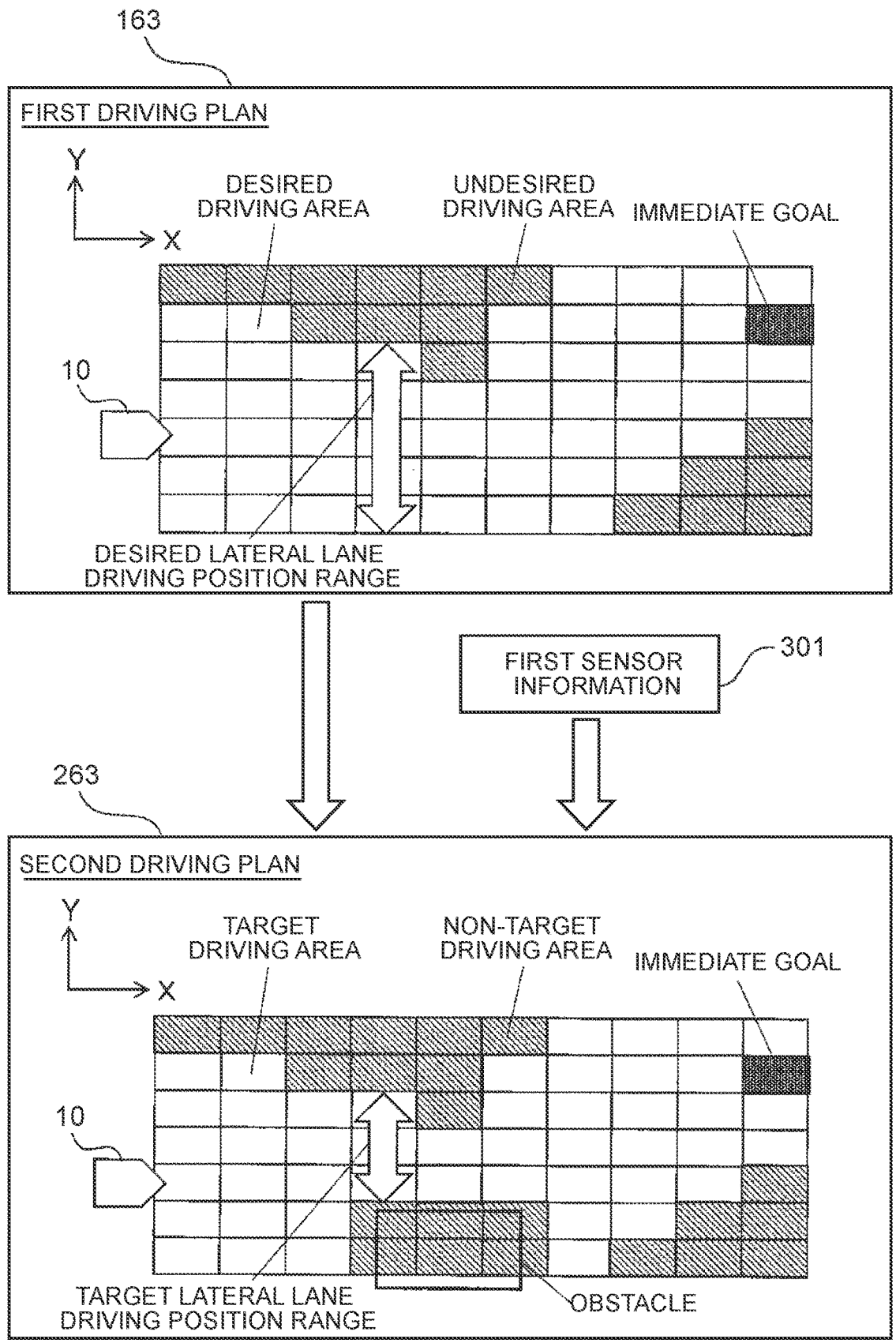
FIG. 12 is a conceptual diagram illustrating a third specific example of the process of generating a second driving plan according to the first embodiment of the disclosure.

FIG. 12 is a conceptual diagram illustrating a third specific example. The data format of a first driving plan 163 shown in FIG. 12 corresponds to the third specific example of the data format of the first driving plan described with reference to FIG. 7. In a second driving plan 263, a tag indicating whether the mesh is a target driving area where the vehicle 10 should be controlled to travel or a non-target driving area where the vehicle 10 should not be allowed to travel is attached to each mesh formed in an area located ahead in the direction of travel of the vehicle 10. Undesired driving areas in the first driving plan 163 are used as non-target driving areas in the second driving plan 263. Those desired driving areas in the first driving plan 163 which do not interfere with the obstacle are used as target driving areas in the second driving plan 263. However, those desired driving areas in the first driving plan 163 which interfere with the obstacle are used as non-target driving areas in the second driving plan 263 in order to avoid collision of the vehicle 10 with the obstacle.

In the second driving plan 263 of the third specific example, each target lateral lane driving position range is represented by the target driving areas located next to each other in the Y direction. The second control device 200 generates a target path within the target lateral lane driving position ranges located next to each other in the direction of travel. The second control device 200 calculates manipulated variables for the vehicle actuators 20 based on target positions and target speeds at each point on the target path so that the vehicle 10 is controlled to follow the target path.

Figure 13:
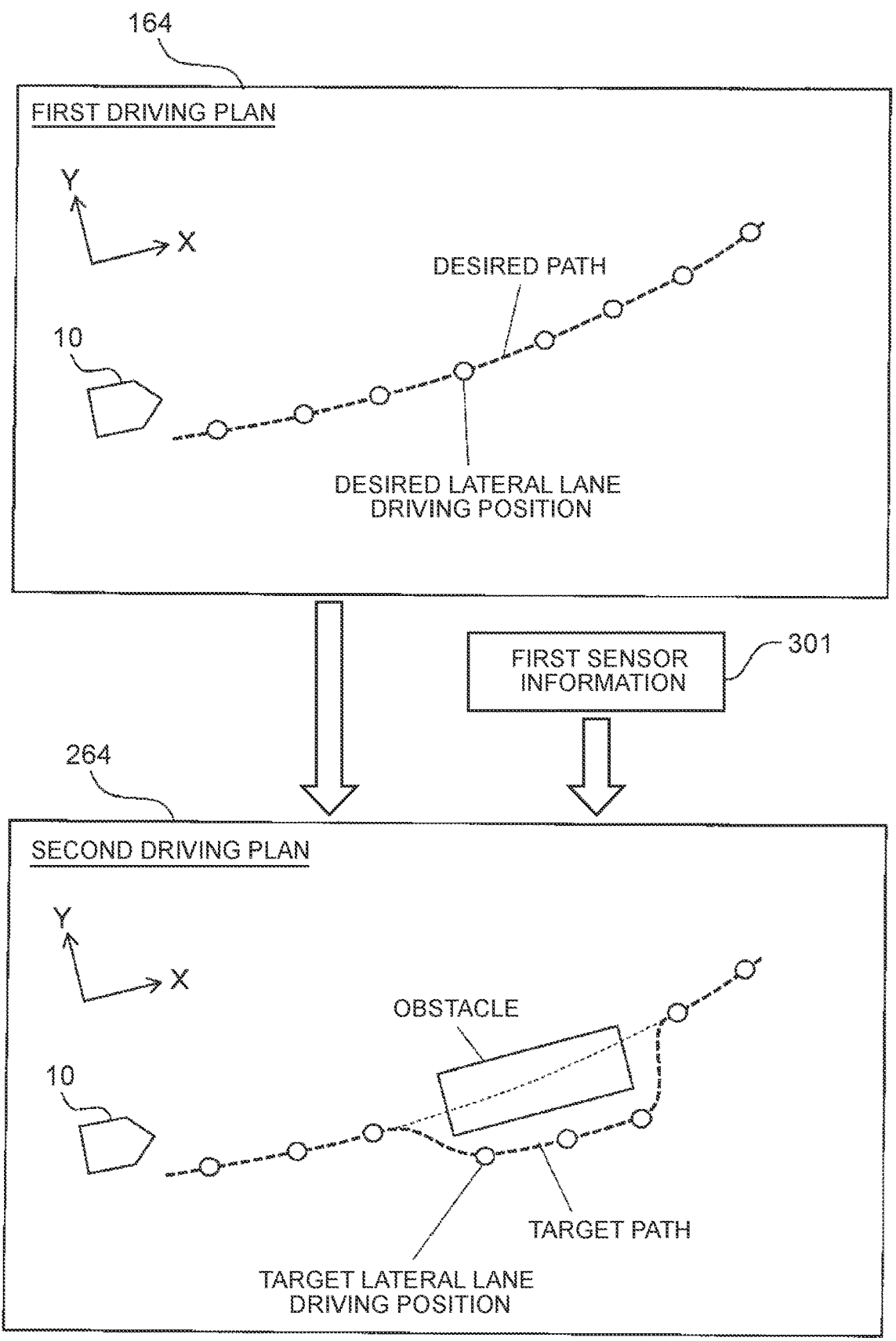
FIG. 13 is a conceptual diagram illustrating a fourth specific example of the process of generating a second driving plan according to the first embodiment of the disclosure.

FIG. 13 is a conceptual diagram illustrating a fourth specific example. The data format of a first driving plan 164 shown in FIG. 13 corresponds to the fourth specific example of the data format of the first driving plan described with reference to FIG. 8. A second driving plan 264 is represented by a set of target lateral lane driving positions located next to each other in the direction of travel. That is, in the fourth specific example, each target lateral lane driving position is represented by one of points defining a driving path (target path) the vehicle 10 should be controlled to follow. In the case where a desired path in the first driving plan 164 does not interfere with the obstacle, the desired path is used as the target path in the second driving plan 264. However, in the case where the desired path in the first driving plan 164 interferes with the obstacle, the target path is generated so as to avoid the obstacle.

The points on the target path indicate lateral lane driving positions most suitable for the service that is provided by the user and causing no collision of the vehicle 10 with the obstacle. The position of each point on the target path is specified by a coordinate system (X, Y) based on the vehicle 10, and the speed at each point on the target path is also specified. The speed at each point on the target path is modified when necessary to avoid the obstacle. The position of each point on the target path is a target position of the vehicle 10, and the speed associated with each point is a target speed of the vehicle 10. The second control device 200 calculates manipulated variables for the vehicle actuators 20 based on the target positions and the target speeds so that the vehicle 10 is controlled to follow the target path.

Figure 14:
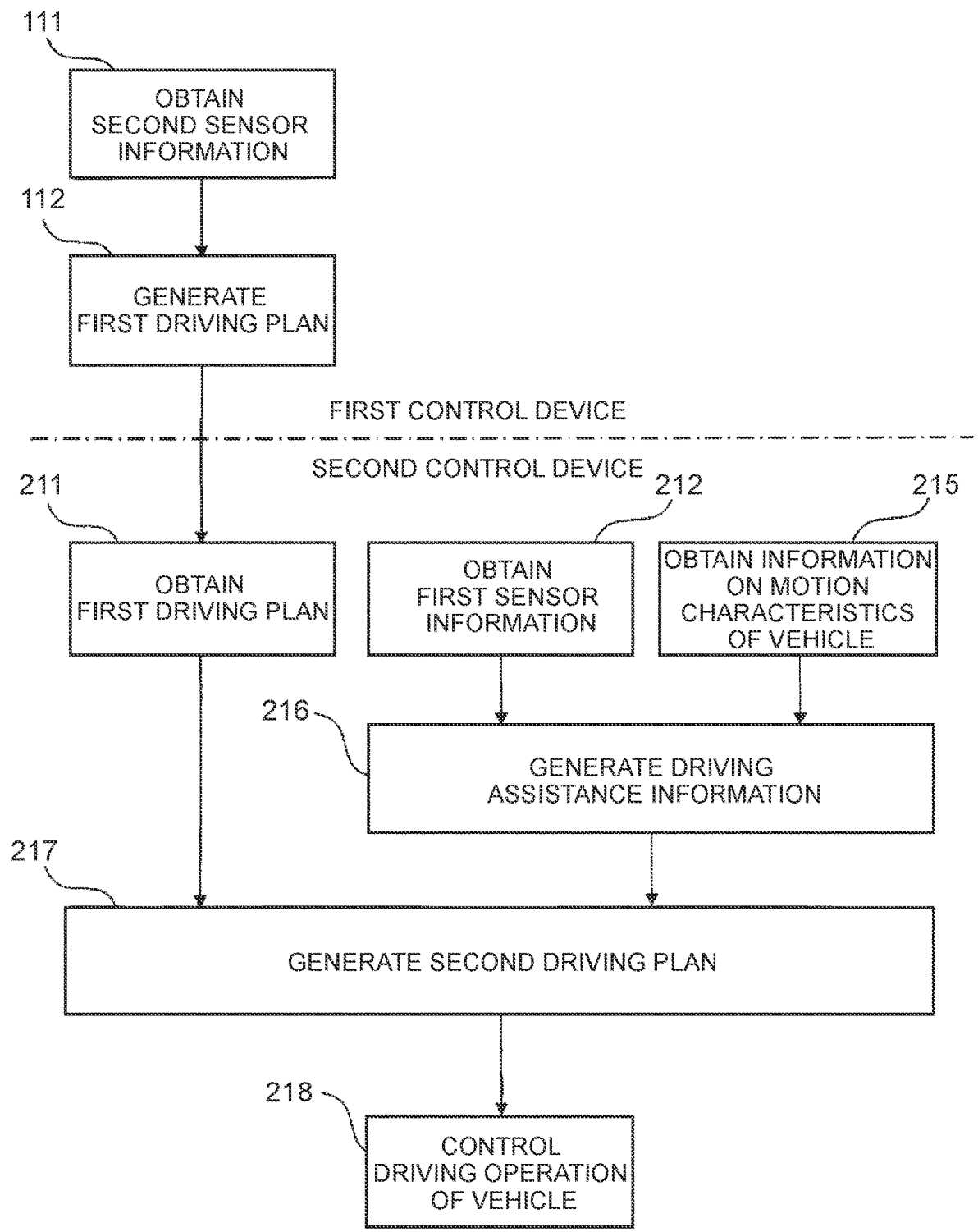
FIG. 14 is a block diagram illustrating functions and process flow of a vehicle control system according to a second embodiment of the disclosure.

7. Functions and Process Flow of Vehicle Control System According to Second Embodiment Next, functions and process flow of a vehicle control system according to a second embodiment of the disclosure will be described with reference to FIG. 14. FIG. 14 is a block diagram illustrating the flow of a series of processes in the second embodiment. In the block diagram, the same processes as those in the first embodiment are denoted with the same reference signs. Since the processes that are performed by the first control device 100 are the same as those in the first embodiment, only the processes that are performed by the second control device 200 will be described below.

In the second embodiment, the second control device 200 performs processes 211, 212, 215, 216, 217, and 218. In the process 211, the second control device 200 obtains the first driving plan generated by the first control device 100. In the process 212, the second control device 200 obtains from the first sensors 30 sensor information including information on motion of the vehicle 10 and information on the surroundings of the vehicle 10. In the process 215, the second control device 200 further obtains information on motion characteristics of the vehicle 10. This information may be either information registered in advance in the storage device 220 or information that is estimated in real time from parameters used for computations in the second control device 200 or information obtained by the first sensors 30 or other on-board sensors.

Subsequently, in the process 216, the second control device 200 generates, based on the sensor information obtained from the first sensors 30 and the information on the motion characteristics of the vehicle 10, driving assistance information that contributes to improvement in driving safety of the vehicle 10. For example, the second control device 200 generates, as the driving assistance information, area information on a dangerous area or a safe area which is located in the direction of travel of the vehicle 10. As a specific example, in the case where an obstacle is detected ahead in the direction of travel of the vehicle 10 by the first sensors 30, the second control device 200 calculates, based on the information on the motion characteristics of the vehicle 10, such an area that the vehicle 10 will not be able to avoid the obstacle even if the vehicle 10 is operated to avoid the obstacle. This area is a dangerous area, and an area that is not the dangerous area is a safe area. The second control device 200 can accurately calculate the dangerous area and the safe area by putting together the information on motion of the vehicle 10 and the information on the surroundings of the vehicle 10 which are obtained from the first sensors 30 and the information on the motion characteristics of the vehicle 10.

Thereafter, in the process 217, the second control device 200 generates a second driving plan based on the first driving plan and the area information. Since the second control device 200 uses the area information generated in view of the motion characteristics of the vehicle 10 to generate the second driving plan, it can accurately calculate appropriate lateral lane driving positions according to the surroundings of the vehicle 10. In the process 218, the second control device 200 calculates manipulated variables for the vehicle actuators 20 according to the second driving plan and controls driving operation of the vehicle 10. The process of generating a second driving plan by the second control device 200 will be described in detail using specific examples.

8. Specific Examples of Process of Generating Second Driving Plan According to Second Embodiment FIGS. 15 to 18 are conceptual diagrams illustrating specific examples of the process of generating a second driving plan according to the second embodiment of the disclosure. In each conceptual diagram, it is assumed that a dangerous area has been specified from area information 302 generated based on the sensor information obtained from the first sensors 30 and the information on the motion characteristics of the vehicle 10. The second driving plan is generated so that the vehicle 10 travels so as to avoid the dangerous area.

Figure 15:
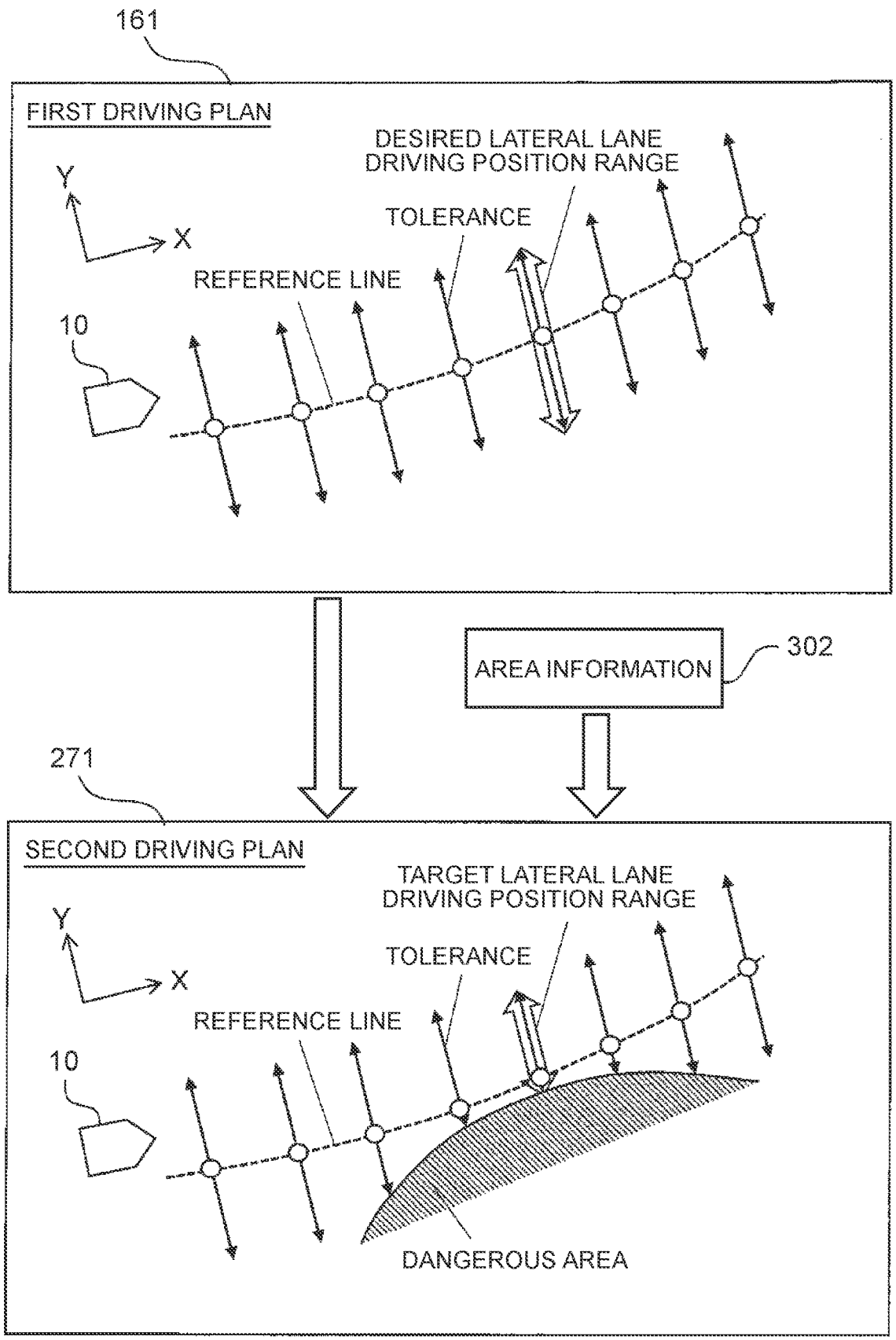
FIG. 15 is a conceptual diagram illustrating a first specific example of a process of generating a second driving plan according to the second embodiment of the disclosure.

FIG. 15 is a conceptual diagram illustrating a first specific example. The data format of the first driving plan 161 shown in FIG. 15 corresponds to the first specific example of the data format of the first driving plan described with reference to FIG. 5. In the case where the reference line in the first driving plan 161 does not interfere with the dangerous area, this reference line is used as a reference line in a second driving plan 271. Tolerance at each point on the reference line indicates how much deviation from the reference line is allowed without interference with the dangerous area when providing the service. For the second driving plan 271, the tolerance at each point is calculated so that target lateral lane driving position ranges do not interfere with the dangerous area. In the case where the reference line in the first driving plan 161 interferes with the dangerous area, the shape of the reference line is modified so as to avoid the dangerous area. In the second driving plan 271, each target lateral lane driving position range is represented by one of points defining the reference line along which the vehicle 10 should be controlled to travel and tolerance at that point. The second control device 200 generates a target path within the target lateral lane driving position ranges located next to each other in the direction of travel and calculates manipulated variables for the vehicle actuators 20 based on target positions and target speeds at each point on the target path.

Figure 16:
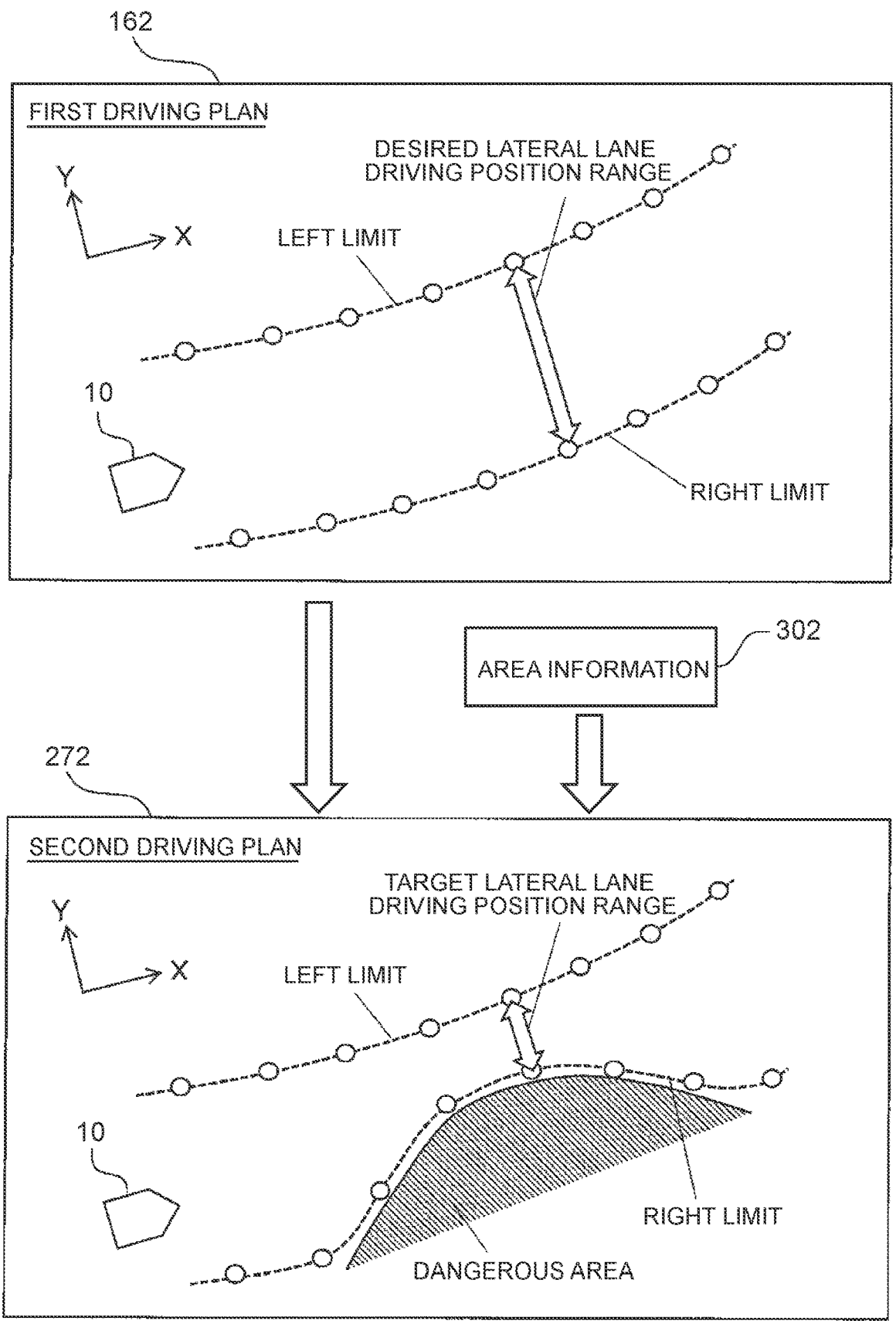
FIG. 16 is a conceptual diagram illustrating a second specific example of the process of generating a second driving plan according to the second embodiment of the disclosure.

FIG. 16 is a conceptual diagram illustrating a second specific example. The data format of the first driving plan 162 shown in FIG. 16 corresponds to the second specific example of the data format of the first driving plan described with reference to FIG. 6. In a second driving plan 272, the positions of right and left limits are adjusted so as not to interfere with the dangerous area. In the example shown in FIG. 16, since the dangerous area interferes with the right limit, the position of the right limit is adjusted inward so as to avoid the vehicle 10 from entering the dangerous area. Similarly, in the case where the dangerous area interferes with the right limit, the position of the left limit is adjusted inward. In the second driving plan 272, each target lateral lane driving position range is represented by one of points defining the left limit and one of points defining the right limit. The second control device 200 generates a target path within the target lateral lane driving position ranges located next to each other in the direction of travel and calculates manipulated variables for the vehicle actuators 20 based on target positions and target speeds at each point on the target path.

Figure 17:
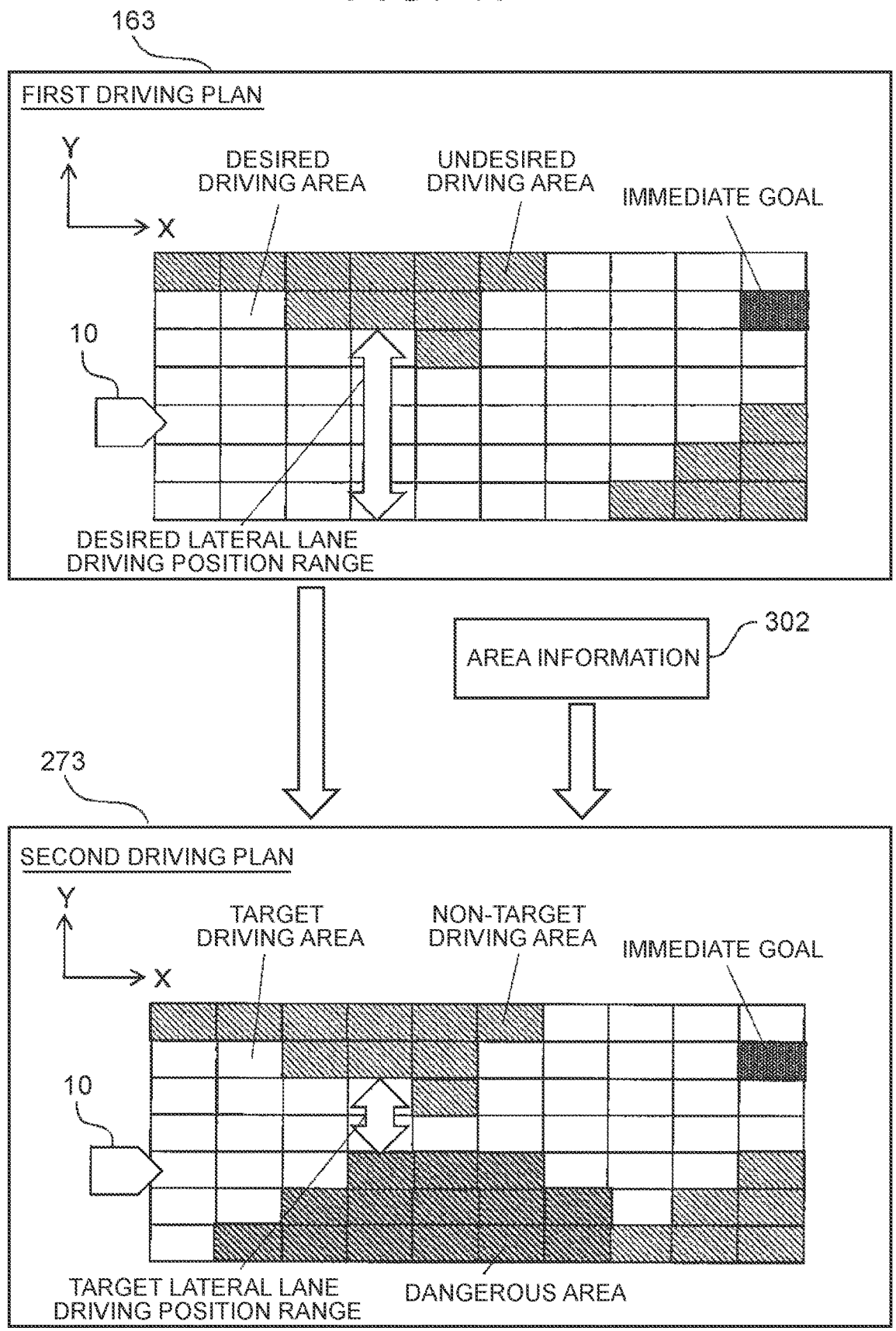
FIG. 17 is a conceptual diagram illustrating a third specific example of the process of generating a second driving plan according to the second embodiment of the disclosure.

FIG. 17 is a conceptual diagram illustrating a third specific example. The data format of the first driving plan 163 shown in FIG. 17 corresponds to the third specific example of the data format of the first driving plan described with reference to FIG. 7. In a second driving plan 273, a tag indicating whether the mesh is a target driving area where the vehicle 10 should be controlled to travel or a non-target driving area where the vehicle 10 should not be allowed to travel is attached to each mesh formed in an area located ahead in the direction of travel of the vehicle 10. A tag indicating that the mesh is a non-target driving area is attached to each mesh that interferes with the dangerous area in order to avoid collision of the vehicle 10 with the obstacle. In the second driving plan 273, each target lateral lane driving position range is represented by the target driving areas located next to each other in the Y direction. The second control device 200 generates a target path within the target lateral lane driving position ranges located next to each other in the direction of travel and calculates manipulated variables for the vehicle actuators 20 based on target positions and target speeds at each point on the target path.

Figure 18:
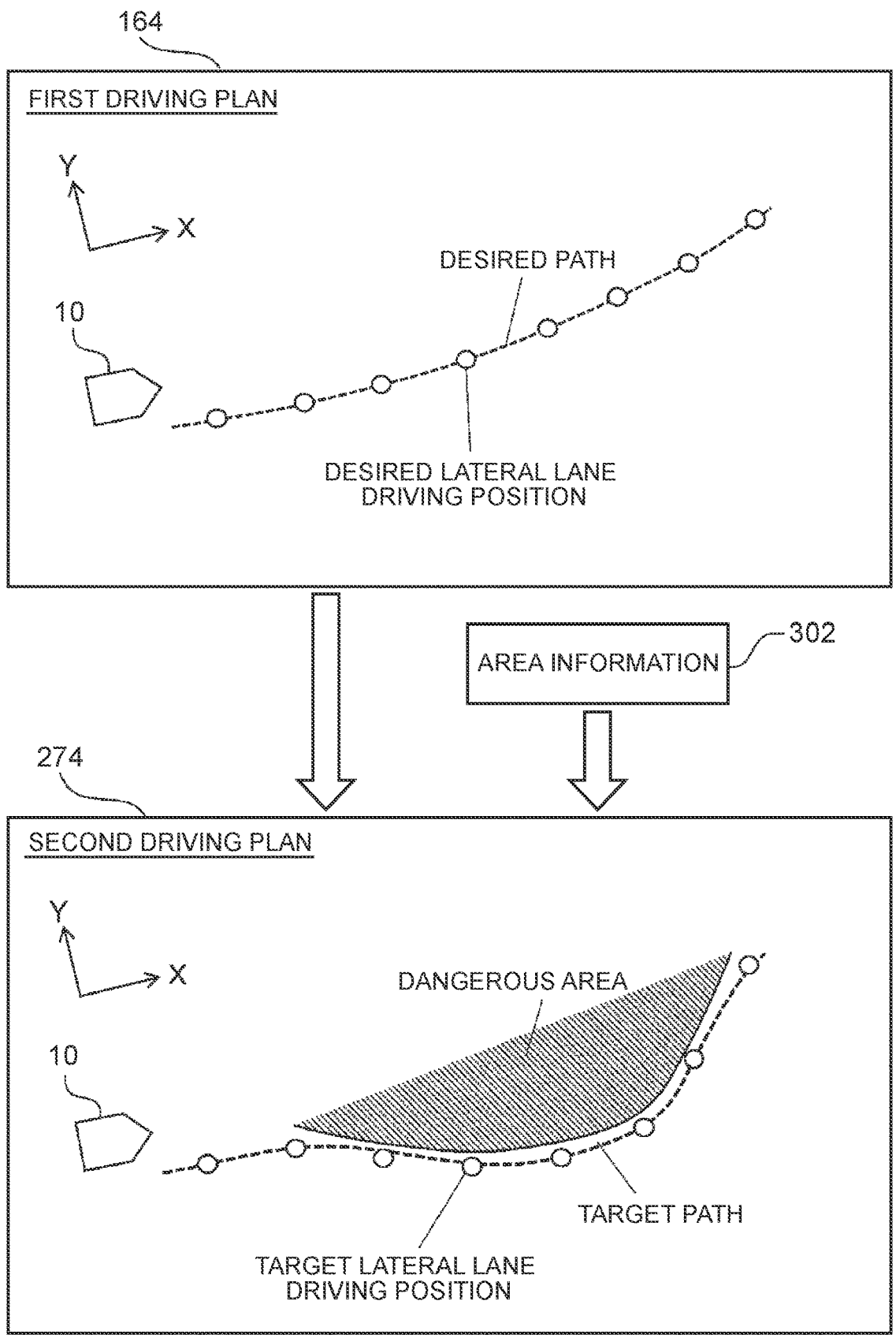
FIG. 18 is a conceptual diagram illustrating a fourth specific example of the process of generating a second driving plan according to the second embodiment of the disclosure.

FIG. 18 is a conceptual diagram illustrating a fourth specific example. The data format of the first driving plan 164 shown in FIG. 18 corresponds to the fourth specific example of the data format of the first driving plan described with reference to FIG. 8. A second driving plan 274 is represented by a set of target lateral lane driving positions located next to each other in the direction of travel. That is, in the fourth specific example, each target lateral lane driving position is represented by one of points defining a driving path (target path) the vehicle 10 should be controlled to follow. In the case where the desired path in the first driving plan 164 does not interfere with the dangerous area, this desired path is used as the target path in the second driving plan 274. However, in the case where the desired path in the first driving plan 164 interferes with the dangerous area, the target path is generated so as to avoid the dangerous area as shown in FIG. 18. The speed at each point on the target path is also modified when necessary to avoid the dangerous area. The second control device 200 calculates manipulated variables for the vehicle actuators 20 based on target positions and target speeds at each point on the target path.

The above specific examples are described with respect to the case where a dangerous area has been specified from the area information 302. In the case where a safe area has been specified from the area information 302, the second driving plan is generated so that the vehicle 10 travels in the safe area. That is, in the case of the first to third specific examples, the target lateral lane driving position ranges are set in the safe area, and the target path is generated within the target lateral lane driving position ranges located next to each other in the direction of travel. In the case of the fourth specific example, the target lateral lane driving positions are determined so as to be located next to each other in the direction of travel within the safe area.

9. Specific Example of Process of Generating Second Driving Plan According to Third Embodiment In a process of generating a second driving plan according to a third embodiment of the disclosure, the second control device 200 generates, as driving assistance information, a third driving plan that is used to select a driving path avoiding a dangerous area or a driving path running in a safe area. The second control device 200 generates a second driving plan based on the first driving plan and the third driving plan.

Figure 19:
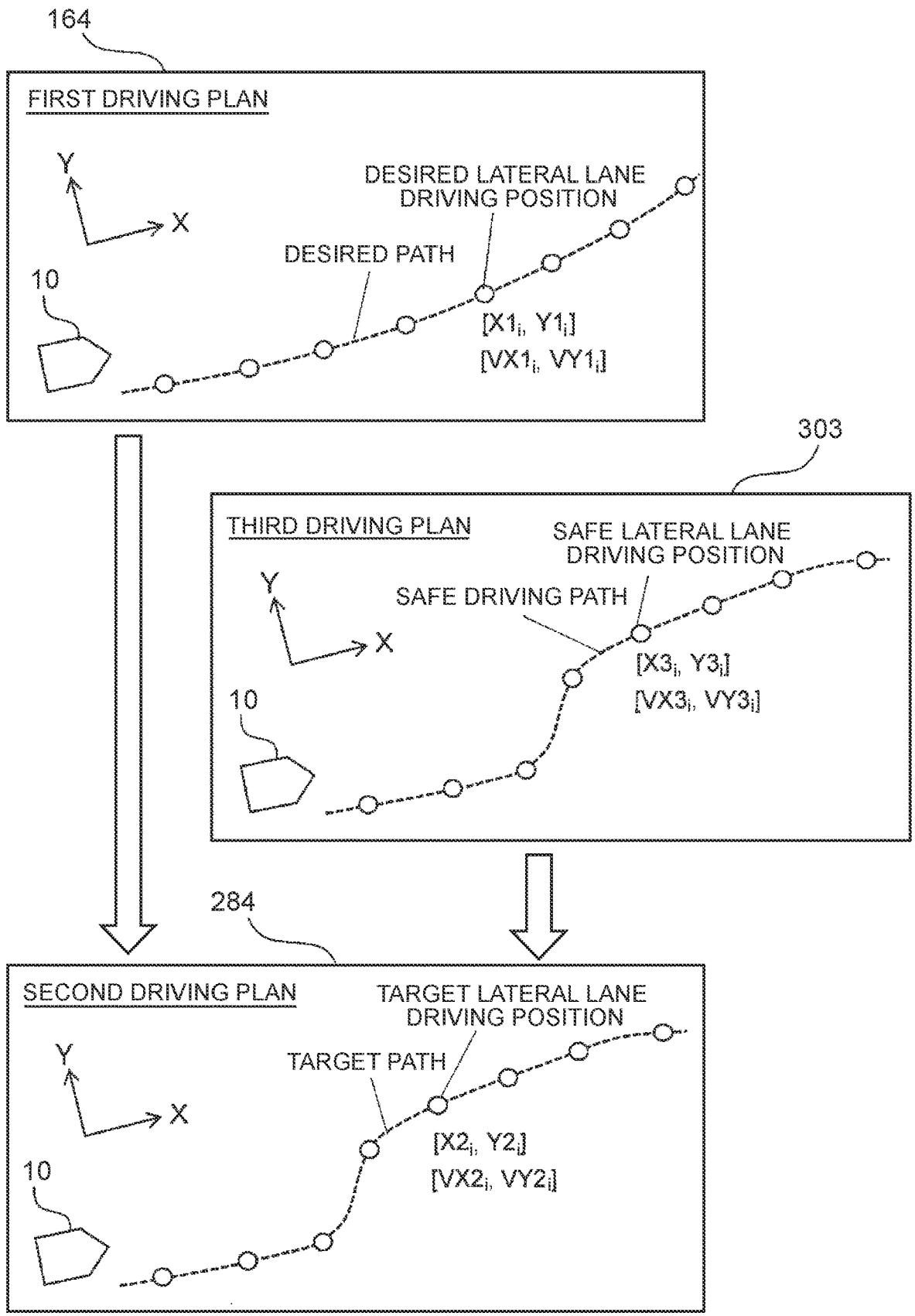
FIG. 19 is a conceptual diagram illustrating a specific example of a process of generating a second driving plan according to a third embodiment of the disclosure.

FIG. 19 is a conceptual diagram illustrating a specific example of the process of generating a second driving plan according to the third embodiment. The data format of the first driving plan 164 shown in FIG. 19 corresponds to the fourth specific example of the data format of the first driving plan described with reference to FIG. 8. The first driving plan 164 defines a desired path, namely a driving path the vehicle 10 is desired to follow. The desired path is represented by a set of desired lateral lane driving positions located next to each other in the direction of travel. A desired speed [$VX1_i$, $VY1_i$] is associated with each desired lateral lane driving position [$X1_i$, $Y1_i$].

A third driving plan 303 is generated based on the sensor information obtained from the first sensors 30 and the information on the motion characteristics of the vehicle 10. The third driving plan 303 defines a safe driving path, namely a driving path that ensures that the vehicle 10 travels safely. The safe driving path may be either a driving path that allows the vehicle 10 to travel while avoiding a dangerous area or a driving path that allows the vehicle 10 to travel only within a safe area. The safe driving path is represented by a set of safe lateral lane driving positions located next to each other in the direction of travel. A safe speed [$VX3_i$, $VY3_i$] is associated with each safe lateral lane driving position [$X3_i$, $Y3_i$] as a restriction on speed of the vehicle 10.

A second driving plan 284 is represented by a set of target lateral lane driving positions located next to each other in the direction of travel. That is, each target lateral lane driving position is represented by one of points defining a target path for the vehicle 10. A target speed [$VX2_i$, $VY2_i$] is associated with each target lateral lane driving position [$X2_i$, $Y2_i$]. The second driving plan 284 may be generated in view of both the first driving plan 164 and the third driving plan 303, or the third driving plan 303 may be used as it is as the second driving plan 284. In the case where the second driving plan 284 is generated in view of both the first driving plan 164 and the third driving plan 303, the target lateral lane driving position [X2, $Y2_i$] is calculated by a weighted mean of the desired lateral lane driving position [$X1_i$, $Y1_i$] and the safe lateral lane driving position [$X3_i$, $Y3_i$]. Similarly, the target speed [$VX2_i$, $VY2_i$] is calculated by a weighted mean of the desired speed [$VX1_i$, $VY1_i$] and the safe speed [$VX3_i$, $VY3_i$]. For these weighted means, the third driving plan 303 may be weighted more than the first driving plan 164.

10. Modifications of Embodiments

In the first to third specific examples of the process of generating a second driving plan according to the first embodiment, the second driving plan has the same data format as the first driving plan. In the first to third specific examples, however, the data format of the second driving plan may be a target path represented by a sequence of points located next to each other in the direction of travel as described in the fourth specific example. Similarly, in the first to third specific examples of the process of generating a second driving plan according to the second embodiment, the data format of the second driving plan may be a target path represented by a sequence of points located next to each other in the direction of travel.

What is claimed is:

1. A vehicle control system for an autonomous vehicle, comprising:
a first electronic control unit (ECU), including a processor configured to execute a program stored in a memory, wherein the first ECU is configured to attach to and detach from the vehicle,
the first ECU being configured to:
generate a first driving plan including desired lateral lane driving positions or desired lateral lane driving position ranges which are located next to each other in a direction of travel of a vehicle;
a plurality of first sensors configured to obtain information on motion of the vehicle and information on surroundings of the vehicle;
one or more second sensors that are coupled to the first ECU and configured to be attached to and detached from the vehicle, and configured to obtain information on the surroundings of the vehicle and to send the information on the surroundings of the vehicle to the first ECU and, wherein the first ECU is configured to generate the first driving plan at least based on the information obtained by the one or more second sensors; and
a second electronic control unit (ECU) including a processor configured to execute a program stored in a memory, wherein the second ECU is mounted on the vehicle,
the second ECU being configured to:
communicate with the first ECU,
generate, based on the first driving plan obtained from the first ECU and the information obtained by the first sensors, a second driving plan different from the first driving plan, the second driving plan including target lateral lane driving positions or target lateral lane driving position ranges which are located next to each other in the direction of travel of the vehicle, and
control driving operation of the vehicle based on the second driving plan,
wherein the first ECU is configured to receive a setting for generation of the first driving plan by a service provider of the vehicle, and the second ECU is configured to prohibit a setting for generation of the second driving plan by the service provider,
wherein the first driving plan is set by the first ECU that is provided by the service provider, and
wherein the second driving plan is set by the second ECU that is provided by a manufacturer of the vehicle.

2. The vehicle control system for the autonomous vehicle according to claim 1, wherein the first driving plan includes vehicle speeds associated with the desired lateral lane driving positions or the desired lateral lane driving position ranges.

3. The vehicle control system for the autonomous vehicle according to claim 1, wherein the second driving plan includes vehicle speeds associated with the target lateral lane driving positions or the target lateral lane driving position ranges.

4. The vehicle control system for the autonomous vehicle according to claim 1, wherein the second ECU is configured to generate the second driving plan based on information on motion characteristics of the vehicle.

5. The vehicle control system for the autonomous vehicle according to claim 4, wherein the second ECU is configured to:
generate, based on the information obtained from the first sensors and the information on the motion characteristics of the vehicle, driving assistance information that contributes to improvement in driving safety of the vehicle, and
generate the second driving plan based on the driving assistance information.

6. The vehicle control system for the autonomous vehicle according to claim 5, wherein the second ECU is configured to generate, as the driving assistance information, area information on a dangerous area or a safe area which is located in the direction of travel of the vehicle.

7. The vehicle control system for the autonomous vehicle according to claim 5, wherein the second ECU is configured to generate, as the driving assistance information, a third driving plan that is used to select a driving path avoiding a dangerous area or a driving path running in a safe area.

8. The vehicle control system for the autonomous vehicle according to claim 7, wherein the third driving plan includes a restriction on speed.

9. The vehicle control system for the autonomous vehicle according to claim 1, wherein
the first ECU is configured to be coupled by wire to the second ECU via a connector when attached to the vehicle.

10. A vehicle control device for an autonomous vehicle, comprising:
a processor detachably coupled to an on-board sensor of the vehicle; and
a storage device storing a program that is executable by the processor, wherein
the processor is configured to, by executing the program,
obtain a first driving plan including desired lateral lane driving positions or desired lateral lane driving position ranges which are located next to each other in a direction of travel of a vehicle,
obtain information on motion of the vehicle and information on surroundings of the vehicle from the on-board sensor,
generate, based on the first driving plan and the information obtained from the onboard sensor, a second driving plan different from the first driving plan, the second driving plan including target lateral lane driving positions or target lateral lane driving position ranges which are located next to each other in the direction of travel of the vehicle, and
control driving operation of the vehicle based on the second driving plan,
wherein the processor is configured to receive a setting for generation of the first driving plan by a service provider of the vehicle, and prohibit a setting for generation of the second driving plan by the service provider,
wherein the first driving plan is set by the service provider, and
wherein the second driving plan is set by a manufacturer of the vehicle.

11. The vehicle control device for the autonomous vehicle according to claim 10, wherein the first driving plan includes vehicle speeds associated with the desired lateral lane driving positions or the desired lateral lane driving position ranges.

12. The vehicle control device for the autonomous vehicle according to claim 10, wherein the second driving plan includes vehicle speeds associated with the target lateral lane driving positions or the target lateral lane driving position ranges.

13. The vehicle control device for the autonomous vehicle according to claim 10, wherein the processor is configured to generate the second driving plan based on information on motion characteristics of the vehicle.

14. The vehicle control device for the autonomous vehicle according to claim 13, wherein
- the processor is configured to generate, based on the information obtained from the onboard sensor and the information on the motion characteristics of the vehicle, driving assistance information that contributes to improvement in driving safety of the vehicle, and
- generate the second driving plan based on the driving assistance information.

15. The vehicle control device for the autonomous vehicle according to claim 14, wherein the processor is configured to generate, as the driving assistance information, area information on a dangerous area or a safe area which is located in the direction of travel of the vehicle.

16. The vehicle control device for the autonomous vehicle according to claim 14, wherein the processor is configured to generate, as the driving assistance information, a third driving plan that is used to select a driving path avoiding a dangerous area or a driving path running in a safe area.

17. The vehicle control device for the autonomous vehicle according to claim 16, wherein the third driving plan includes a restriction on speed.

18. The vehicle control device for the autonomous vehicle according to claim 10, further comprising a connector for coupling to an external computer that is configured to be attached to and detached from the vehicle, wherein
- the processor is configured to obtain the first driving plan from the external computer coupled to the connector.

* * * * *